US011575772B2

(12) United States Patent
Brito et al.

(10) Patent No.: US 11,575,772 B2
(45) Date of Patent: Feb. 7, 2023

(54) SYSTEMS AND METHODS FOR INITIATING PROCESSING ACTIONS UTILIZING AUTOMATICALLY GENERATED DATA OF A GROUP-BASED COMMUNICATION SYSTEM

(71) Applicant: Salesforce, Inc., San Francisco, CA (US)

(72) Inventors: Diogenes Brito, New York, NY (US); Salman Suhail, San Francisco, CA (US); Bruce Sullivan, San Francisco, CA (US); Patricia Ang, Oakland, CA (US); Hye Jung Choi, San Mateo, CA (US); Prajna Shetty, San Francisco, CA (US); Andrew Fong, Menlo Park, CA (US); Michael Deng, San Francisco, CA (US); Stephen Sowole, San Francisco, CA (US); Tolga Akin, San Francisco, CA (US); Pranay Agarwal, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/324,035

(22) Filed: May 18, 2021

(65) Prior Publication Data
US 2021/0274014 A1 Sep. 2, 2021

Related U.S. Application Data

(63) Continuation of application No. 16/399,795, filed on Apr. 30, 2019, now Pat. No. 10,778,734, which is a (Continued)

(51) Int. Cl.
*H04L 67/60* (2022.01)
*H04L 9/40* (2022.01)
(Continued)

(52) U.S. Cl.
CPC ............ *H04L 67/60* (2022.05); *G06F 3/0482* (2013.01); *H04L 12/1813* (2013.01);
(Continued)

(58) Field of Classification Search
CPC ... H04L 12/1859; H04L 51/046; H04L 51/16; H04L 65/403
See application file for complete search history.

(56) References Cited

U.S. PATENT DOCUMENTS 7,644,144 B1 1/2010 Horvitz et al.
8,522,258 B1 * 8/2013 Shaw ...................... H04W 4/90
719/318
(Continued)

FOREIGN PATENT DOCUMENTS

JP 2015184827 A 10/2015

OTHER PUBLICATIONS

The European Office Action dated May 26, 2021 for European Patent Application No. 20718102.5, a counterpart foreign application of the U.S. Pat. No. 10,771,589, 10 pages.
(Continued)

*Primary Examiner* — Shean Tokuta
(74) *Attorney, Agent, or Firm* — Lee & Hayes, P.C.

(57) ABSTRACT

A group-based communication platform is configured to initialize processing actions executable via validated external resources. Moreover, the group-based communication platform may recommend specific processing actions to a user based at least in part on the user's activity in interacting with the group-based communication platform (e.g., via a client device), wherein such activity may be represented as environmental contextual data. Moreover, once the user selects a particular processing action for execution, the group-based communication retrieves at least a portion of the generated environmental contextual data to be passed to
(Continued)

the validated external resource for use in executing the selected processing action.

20 Claims, 10 Drawing Sheets

Related U.S. Application Data continuation of application No. 16/399,784, filed on Apr. 30, 2019, now Pat. No. 11,025,743, which is a continuation of application No. 16/399,730, filed on Apr. 30, 2019, now Pat. No. 10,771,589.

(51) Int. Cl.

| | |
|---|---|
| H04L 65/1069 | (2022.01) |
| H04L 65/403 | (2022.01) |
| H04L 67/141 | (2022.01) |
| H04L 67/146 | (2022.01) |
| H04L 67/306 | (2022.01) |
| G06F 3/0482 | (2013.01) |
| H04L 12/18 | (2006.01) |
| H04L 67/025 | (2022.01) |
| H04L 67/568 | (2022.01) |
| H04L 67/01 | (2022.01) |

(52) U.S. Cl.
CPC ........ *H04L 63/0807* (2013.01); *H04L 63/104* (2013.01); *H04L 65/1069* (2013.01); *H04L 65/403* (2013.01); *H04L 67/025* (2013.01); *H04L 67/141* (2013.01); *H04L 67/146* (2013.01); *H04L 67/306* (2013.01); *H04L 67/568* (2022.05); *H04L 67/01* (2022.05)

(56) References Cited

U.S. PATENT DOCUMENTS

| | | | | |
|---|---|---|---|---|
| 9,392,314 | B1* | 7/2016 | Lewis | H04N 21/2408 |
| 9,632,851 | B1 | 4/2017 | Johansson et al. | |
| 9,940,394 | B1* | 4/2018 | Grant | G06F 16/951 |
| 10,348,655 | B1* | 7/2019 | Suhail | H04L 65/1045 |
| 10,540,892 | B1* | 1/2020 | Fields | B60W 40/09 |
| 10,607,165 | B2* | 3/2020 | Punera | G06Q 10/063114 |
| 10,771,589 | B1* | 9/2020 | Brito | H04L 12/1813 |
| 10,853,867 | B1* | 12/2020 | Bulusu | G06Q 30/0631 |
| 2010/0082759 | A1* | 4/2010 | Nalliah | H04L 51/58 |
| | | | | 709/206 |
| 2011/0016421 | A1* | 1/2011 | Krupka | G06F 40/20 |
| | | | | 715/810 |
| 2011/0040814 | A1 | 2/2011 | Higgins | |
| 2011/0055065 | A1* | 3/2011 | Brenner | G06Q 40/00 |
| | | | | 706/46 |
| 2011/0072393 | A1* | 3/2011 | Wilairat | G06F 9/451 |
| | | | | 715/810 |
| 2011/0119628 | A1* | 5/2011 | Carter | G06Q 10/1093 |
| | | | | 715/811 |
| 2011/0137991 | A1 | 6/2011 | Russell | |
| 2011/0321033 | A1 | 12/2011 | Kelkar et al. | |
| 2012/0041907 | A1 | 2/2012 | Wang et al. | |
| 2012/0176509 | A1* | 7/2012 | Aravamudan | H04N 21/23 |
| | | | | 348/E5.031 |
| 2013/0055112 | A1* | 2/2013 | Joseph | G06Q 10/107 |
| | | | | 715/758 |
| 2013/0185196 | A1* | 7/2013 | Kadur | G06Q 20/401 |
| | | | | 705/39 |
| 2013/0197967 | A1* | 8/2013 | Pinto | G06Q 10/0637 |
| | | | | 705/7.36 |
| 2013/0268507 | A1* | 10/2013 | Macbeth | G06Q 30/0631 |
| | | | | 707/723 |
| 2013/0311568 | A1* | 11/2013 | Wang | G06N 5/02 |
| | | | | 709/204 |
| 2014/0372902 | A1* | 12/2014 | Bryant | G06Q 30/0267 |
| | | | | 715/748 |
| 2015/0128058 | A1* | 5/2015 | Anajwala | H04L 67/025 |
| | | | | 715/739 |
| 2015/0163945 | A1* | 6/2015 | Barton | H04L 12/2818 |
| | | | | 361/809 |
| 2015/0281155 | A1* | 10/2015 | Cue | H04L 51/212 |
| | | | | 715/752 |
| 2015/0331711 | A1* | 11/2015 | Huang | G06F 9/542 |
| | | | | 719/320 |
| 2016/0092039 | A1* | 3/2016 | Chien | H04L 51/58 |
| | | | | 715/752 |
| 2016/0112366 | A1 | 4/2016 | Olsen et al. | |
| 2016/0156584 | A1 | 6/2016 | Hum et al. | |
| 2016/0239352 | A1 | 8/2016 | Evans | |
| 2016/0292280 | A1* | 10/2016 | Dave | G06F 16/24578 |
| 2016/0315996 | A1* | 10/2016 | Ha | H04L 12/2821 |
| 2017/0093700 | A1 | 3/2017 | Gilley et al. | |
| 2017/0315680 | A1* | 11/2017 | Yip | H04L 51/02 |
| 2018/0101865 | A1* | 4/2018 | Pan | G06Q 30/0255 |
| 2018/0181997 | A1* | 6/2018 | Sanjeevaiah Krishnaiah | |
| | | | | H04L 67/53 |
| 2018/0232111 | A1* | 8/2018 | Jones | G06F 3/0482 |
| 2018/0285465 | A1* | 10/2018 | Schaffernoth | G06F 16/29 |
| 2018/0287982 | A1 | 10/2018 | Draeger et al. | |
| 2018/0295146 | A1* | 10/2018 | Kovega | H04L 63/1416 |
| 2018/0365309 | A1* | 12/2018 | Oliner | G06F 9/542 |
| 2019/0028287 | A1 | 1/2019 | Jin et al. | |
| 2019/0087152 | A1* | 3/2019 | Aggarwal | G06Q 10/10 |
| 2019/0108453 | A1* | 4/2019 | Schwabe | G06N 20/00 |
| 2019/0109915 | A1 | 4/2019 | McPhee et al. | |
| 2019/0140995 | A1* | 5/2019 | Roller | G06F 40/295 |
| 2019/0215288 | A1* | 7/2019 | Diriye | H04L 51/18 |
| 2019/0340202 | A1* | 11/2019 | Kandur Raja | G06F 16/94 |
| 2019/0356615 | A1* | 11/2019 | Suhail | H04L 65/401 |
| 2020/0004827 | A1* | 1/2020 | Salomatin | G06F 16/9535 |
| 2020/0117491 | A1* | 4/2020 | Kwong | G06F 3/0482 |
| 2020/0142935 | A1* | 5/2020 | Venkatesan | G06F 16/9024 |
| 2020/0159895 | A1* | 5/2020 | Ogata | G06F 21/316 |
| 2020/0348802 | A1 | 11/2020 | Brito et al. | |
| 2021/0004747 | A1* | 1/2021 | Takahashi | G06Q 10/06315 |
| 2021/0274014 | A1* | 9/2021 | Brito | H04L 67/306 |

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Canadian Office Action dated Apr. 8, 2021 for Canadian Patent Application No. 3107499, a foreign counterpart to U.S. Pat. No. 10,771,589, 4 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

(56) References Cited

OTHER PUBLICATIONS

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?content=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—a New Communication System Based on Awareness and Text Communications", Fujitsu Sci. Tech. J., 36, 2, (Dec. 2000) pp. 154-161.

Office Action for U.S. Appl. No. 16/399,784, dated Jul. 24, 2020, Brito, "Systems and Methods for Initiating Processing Actions Utilizing Automatically Generated Data of a Group-Based Communication System", 10 Pages.

Office Action for U.S. Appl. No. 16/399,784, dated Nov. 18, 2020, Brito, "Systems and Methods for Initiating Processing Actions Utilizing Automatically Generated Data of a Group-Based Communication System", 14 Pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

The PCT Search Report and Written Opinion dated Jun. 17, 2020 for PCT Application No. PCT/US2020/023770, 12 pages.

Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

Canadian Office Action dated Sep. 7, 2021 for Canadian Application No. 3107499, a foreign counterpart to U.S. Pat. No. 10,771,589, 3 pages.

Japanese Office Action dated Oct. 12, 2021 for Japanese Patent Application No. 2021-503553, a foreign counterpart to U.S. Pat. No. 10,771,589, 7 pages.

The Summons to Attend Oral Proceedings mailed on Nov. 18, 2021, for European Patent Application No. 20718102.5, 14 pages.

* cited by examiner

SYSTEMS AND METHODS FOR INITIATING PROCESSING ACTIONS UTILIZING AUTOMATICALLY GENERATED DATA OF A GROUP-BASED COMMUNICATION SYSTEM

CROSS-REFERENCE TO RELATED APPLICATIONS

This patent application is a continuation of U.S. patent application Ser. No. 16/399,795, filed Apr. 30, 2019, now U.S. Pat. No. 10,778,734, which is a continuation of U.S. patent application Ser. No. 16/399,784, filed Apr. 30, 2019, which is a continuation of U.S. patent application Ser. No. 16/399,730, filed Apr. 30, 2019, now U.S. Pat. No. 10,771,589, each of which is incorporated herein by reference in their entirety.

BACKGROUND

Systems have been provided for exchanging and consolidating objects within a communications interface among a plurality of client devices and external resources via an at least partially centralized server system.

Through applied effort, ingenuity, and innovation many deficiencies of such systems have been solved by developing solutions that are in accordance with the embodiments of the present invention, many examples of which are described in detail herein.

BRIEF SUMMARY

Various embodiments are directed to systems and methods for enabling substantive interactions between a group-based communication platform and one or more validated external resources by passing automatically generated and selected data from the group-based communication platform to at least one of the one or more validated external resources based on a user's interaction with the group-based communication platform (e.g., via a client device).

A first embodiment is directed to a system configured for initializing a processing action via a group-based communication platform in communication with an validated external resource, wherein the group-based communication platform comprises: one or more non-transitory memory storage repositories, wherein the one or more non-transitory memory storage repositories comprise a processing action table identifying one or more processing actions; and one or more processors, wherein the one or more processors are collectively configured to: receive a selection of a processing action for initialization from a client device, wherein the processing action is selected from the processing action table; generate a container comprising routing data and payload data, wherein the routing data identifies the processing action selected from the processing action table to be performed by an validated external resource and the payload data comprises environmental contextual data generated based at least in part on interactions of the client device with the group-based communication platform during a current connection session; provide the container to the validated external resource to initialize the identified processing action based at least in part on the payload data; receive a response from the validated external resource, wherein the response comprises data identifying one or more interactive dialogs for presentation to the client device; based at least in part on the response, cause the client device to display the one or more interactive dialogs; receive additional data from the client device via the one or more interactive dialogs; and transmit the additional data to the validated external resource to utilize the additional data to execute the processing action.

In certain embodiments, the one or more processors are further configured to receive the environmental contextual data generated at the client device. In other embodiments, the one or more processors are further configured to: generate the environmental contextual data to represent user interactions with a group-based communication interface transmitted to the client device during the current communication session; and store the environmental contextual data within a cache memory portion of the one or more non-transitory memory storage repositories; and wherein the environmental contextual data provided within the payload data is retrieved from the cache memory portion of the one or more non-transitory memory storage repositories.

In various embodiments, the processing action is selected from a contextual processing action list populated from the processing action table, wherein the contextual processing action list is populated with a plurality of available processing actions selected based at least in part on the environmental contextual data. Moreover, the available processing actions within the contextual processing action list may be ranked based on a determined relevance score generated for each available processing action based at least in part on the environmental contextual data.

In certain embodiments, the processing action is selected from one of a plurality of available processing action types, and wherein the processing action is selected from a contextual processing action list populated from the processing action table, wherein the contextual processing action list is populated with a plurality of available processing actions of the selected processing action type. Moreover, in various embodiments, the environmental contextual data is selected for inclusion with the payload data based at least in part on the selected processing action. In various embodiments, the environmental contextual data comprises one or more of: a current session identifier, an active group identifier, or an active channel identifier. Moreover, the one or more interactive dialogs may each comprise one or more fillable form fields and at least one of the one or more fillable form fields of at least one of the one or more interactive dialogs comprise data generated automatically based at least in part on the environmental contextual data. In certain embodiments, at least a portion of the additional data comprises user input. Moreover, at least a portion of the additional data may comprise user input confirming the data generated automatically based at least in part on the environmental contextual data.

A second embodiment is directed to a computer-program product for initializing a processing action via a group-based communication platform in communication with an validated external resource, the computer program product comprising at least one non-transitory computer-readable storage medium having computer-readable program code portions stored therein, the computer-readable program code portions comprising an executable portion configured to: receive a selection of a processing action for initialization from a client device, wherein the processing action is selected from a processing action table identifying one or more processing actions; generate a container comprising routing data and payload data, wherein the routing data identifies the processing action selected from the processing action table to be performed by an validated external resource and the payload data comprises environmental contextual data generated based at least in part on interactions of the client device with the group-based communication platform during a current connection session; provide the container to the validated external resource to initialize the identified processing action based at least in part on the payload data; receive a response from the validated external resource, wherein the response comprises data identifying one or more interactive dialogs for presentation to the client device; based at least in part on the response, cause the client device to display the one or more interactive dialogs; receive additional data from the client device via the one or more interactive dialogs; and transmit the additional data to the validated external resource to utilize the additional data to execute the processing action.

In various embodiments, the computer-readable program code portions further comprise an executable portion to receive the environmental contextual data generated at the client device. Moreover, the computer-readable program code portions may further comprise an executable portion to: generate the environmental contextual data to represent user interactions with a group-based communication interface transmitted to the client device during the current communication session; and store the environmental contextual data within a cache memory portion of the one or more non-transitory memory storage repositories; and wherein the environmental contextual data provided within the payload data is retrieved from the cache memory portion of the one or more non-transitory memory storage repositories.

In certain embodiments, the processing action is selected from a contextual processing action list populated from the processing action table, wherein the contextual processing action list is populated with a plurality of available processing actions selected based at least in part on the environmental contextual data. Moreover, in various embodiments, the available processing actions within the contextual processing action list are ranked based on a determined relevance score generated for each available processing action based at least in part on the environmental contextual data. In certain embodiments, the processing action is selected from one of a plurality of available processing action types, and wherein the processing action is selected from a contextual processing action list populated from the processing action table, wherein the contextual processing action list is populated with a plurality of available processing actions of the selected processing action type. Moreover, the environmental contextual data may be selected for inclusion with the payload data based at least in part on the selected processing action.

Moreover, the environmental contextual data may comprise one or more of: a current session identifier, an active group identifier, or an active channel identifier. In certain embodiments, the one or more interactive dialogs each comprise one or more fillable form fields and at least one of the one or more fillable form fields of at least one of the one or more interactive dialogs comprise data generated automatically based at least in part on the environmental contextual data. Moreover, in various embodiments, at least a portion of the additional data comprises user input. In certain embodiments, at least a portion of the additional data comprises user input confirming the data generated automatically based at least in part on the environmental contextual data.

A third embodiment is directed to a computer-implemented method for initializing a processing action via a group-based communication platform in communication with an validated external resource, the method comprising: receiving, via one or more processors, a selection of a processing action for initialization from a client device, wherein the processing action is selected from a processing action table stored within one or more non-transitory memory storage repositories and wherein the processing action table identifies one or more processing actions; generating, via the one or more processors, a container comprising routing data and payload data, wherein the routing data identifies the processing action selected from the processing action table to be performed by an validated external resource and the payload data comprises environmental contextual data generated based at least in part on interactions of the client device with the group-based communication platform during a current connection session; providing, via the one or more processors, the container to the validated external resource to initialize the identified processing action based at least in part on the payload data; receiving, via the one or more processors, a response from the validated external resource, wherein the response comprises data identifying one or more interactive dialogs for presentation to the client device; based at least in part on the response, causing the client device to display the one or more interactive dialogs; receiving, via the one or more processors, additional data from the client device via the one or more interactive dialogs; and transmitting, via the one or more processors, the additional data to the validated external resource to utilize the additional data to execute the processing action.

In various embodiments, the method further comprises receiving the environmental contextual data generated at the client device. Moreover, the method may further comprise generate the environmental contextual data to represent user interactions with a group-based communication interface transmitted to the client device during the current communication session; and store the environmental contextual data within a cache memory portion of the one or more non-transitory memory storage repositories; and wherein the environmental contextual data provided within the payload data is retrieved from the cache memory portion of the one or more non-transitory memory storage repositories.

In certain embodiments, the processing action is selected from a contextual processing action list populated from the processing action table, wherein the contextual processing action list is populated with a plurality of available processing actions selected based at least in part on the environmental contextual data. Moreover, the available processing actions within the contextual processing action list may be ranked based on a determined relevance score generated for each available processing action based at least in part on the environmental contextual data. In certain embodiments, the processing action is selected from one of a plurality of available processing action types, and wherein the processing action is selected from a contextual processing action list populated from the processing action table, wherein the contextual processing action list is populated with a plurality of available processing actions of the selected processing action type.

Moreover, in various embodiments, the environmental contextual data is selected for inclusion with the payload data based at least in part on the selected processing action. In certain embodiments, the environmental contextual data comprises one or more of: a current session identifier, an active group identifier, or an active channel identifier. Moreover, the one or more interactive dialogs each comprise one or more fillable form fields and at least one of the one or more fillable form fields of at least one of the one or more interactive dialogs comprise data generated automatically based at least in part on the environmental contextual data. In various embodiments, at least a portion of the additional data comprises user input.

In certain embodiments, at least a portion of the additional data comprises user input confirming the data generated automatically based at least in part on the environmental contextual data.

Certain embodiments are directed to a system comprising: one or more non-transitory memory storage repositories, wherein the one or more non-transitory memory storage repositories comprise a processing action table identifying one or more processing actions; and one or more processors, wherein the one or more processors are collectively configured to: receive environmental contextual data generated for a client device, wherein the environmental contextual data is generated based at least in part on interactions of the client device with the group-based communication platform during a current connection session; generate relevance scores for each of a plurality of processing actions identified within a processing action table based at least in part on the environmental contextual data generated for the client device; based at least in part on the relevance scores, generate a contextual processing action list of one or more of the plurality of processing actions; and transmit the contextual processing action list of the one or more of the plurality of processing actions to the client device for presentation via a group-based communication interface.

In certain embodiments, the one or more processors are further configured to: receive a selection of a processing action for initialization from a client device, wherein the processing action is selected from the contextual processing action list; generate a container comprising routing data and payload data, wherein the routing data identifies the processing action selected from the processing action table to be performed by an validated external resource and the payload data comprises at least a portion of the environmental contextual data; provide the container to the validated external resource to initialize the identified processing action based at least in part on the payload data.

In various embodiments, the one or more processors are further configured to receive the environmental contextual data generated at the client device. Moreover, the one or more processors may be further configured to: generate the environmental contextual data to represent user interactions with a group-based communication interface transmitted to the client device during a current communication session; and store the environmental contextual data within a cache memory portion of the one or more non-transitory memory storage repositories; and wherein the environmental contextual data provided within the payload data is retrieved from the cache memory portion of the one or more non-transitory memory storage repositories.

In certain embodiments, the processing actions included within the contextual processing action list are provided for display in ranked order based at least in part on the determined relevance scores. In various embodiments, the one or more processors are further configured to receive data from the client device identifying one of a plurality of available processing action types; and wherein generating relevance scores comprises generating relevance scores for a plurality of processing actions of the identified processing action type. In various embodiments, the environmental contextual data comprises one or more of: a current session identifier, an active group identifier, or an active channel identifier. Moreover, the processing actions included within the contextual processing action list may comprise at least a first processing action executable by a first validated external resource and a second processing action executable by a second validated external resource. In certain embodiments, transmitting the contextual processing action list to a client device comprises causing the client device to generate an interface component to display the contextual processing action within a group-based communication interface. Moreover, at least one of the plurality of processing actions may be automatically generated based at least in part on historical data.

Various embodiments are directed to a computer-program product comprising at least one non-transitory computer-readable storage medium having computer-readable program code portions stored therein, the computer-readable program code portions comprising an executable portion configured to: receive environmental contextual data generated for a client device, wherein the environmental contextual data is generated based at least in part on interactions of the client device with the group-based communication platform during a current connection session; generate relevance scores for each of a plurality of processing actions identified within a processing action table based at least in part on the environmental contextual data generated for the client device; based at least in part on the relevance scores, generate a contextual processing action list of one or more of the plurality of processing actions; and transmit the contextual processing action list of the one or more of the plurality of processing actions to the client device for presentation via a group-based communication interface.

In certain embodiments, the computer-readable program code portions further comprise an executable portion to: receive a selection of a processing action for initialization from a client device, wherein the processing action is selected from the contextual processing action list; generate a container comprising routing data and payload data, wherein the routing data identifies the processing action selected from the processing action table to be performed by an validated external resource and the payload data comprises at least a portion of the environmental contextual data; provide the container to the validated external resource to initialize the identified processing action based at least in part on the payload data.

Moreover, in certain embodiments, the computer-readable program code portions further comprise an executable portion to receive the environmental contextual data generated at the client device. In certain embodiments, the computer-readable program code portions further comprise an executable portion to: generate the environmental contextual data to represent user interactions with a group-based communication interface transmitted to the client device during a current communication session; and store the environmental contextual data within a cache memory portion of the one or more non-transitory memory storage repositories; and wherein the environmental contextual data provided within the payload data is retrieved from the cache memory portion of the one or more non-transitory memory storage repositories.

In various embodiments, the processing actions included within the contextual processing action list are provided for display in ranked order based at least in part on the determined relevance scores. Moreover, the computer-readable program code portions further comprise an executable portion to receive data from the client device identifying one of a plurality of available processing action types; and wherein generating relevance scores comprises generating relevance scores for a plurality of processing actions of the identified processing action type.

In certain embodiments, the environmental contextual data comprises one or more of: a current session identifier, an active group identifier, or an active channel identifier. Moreover, the processing actions included within the contextual processing action list comprise at least a first processing action executable by a first validated external resource and a second processing action executable by a second validated external resource. In certain embodiments, transmitting the contextual processing action list to a client device comprises causing the client device to generate an interface component to display the contextual processing action within a group-based communication interface. Moreover, at least one of the plurality of processing actions may be automatically generated based at least in part on historical data.

Certain embodiments are directed to a computer-implemented method comprising: receiving, via one or more processors, environmental contextual data generated for a client device, wherein the environmental contextual data is generated based at least in part on interactions of the client device with the group-based communication platform during a current connection session; generating, via the one or more processors, relevance scores for each of a plurality of processing actions identified within a processing action table based at least in part on the environmental contextual data generated for the client device; based at least in part on the relevance scores, generating, via the one or more processors, a contextual processing action list of one or more of the plurality of processing actions; and transmitting, via the one or more processors, the contextual processing action list of the one or more of the plurality of processing actions to the client device for presentation via a group-based communication interface.

Moreover, in various embodiments, the method further comprises receiving a selection of a processing action for initialization from a client device, wherein the processing action is selected from the contextual processing action list; generating a container comprising routing data and payload data, wherein the routing data identifies the processing action selected from the processing action table to be performed by an validated external resource and the payload data comprises at least a portion of the environmental contextual data; transmitting the container to the validated external resource to initialize the identified processing action based at least in part on the payload data. Moreover, the method may further comprise receiving the environmental contextual data generated at the client device. In certain embodiments, the method further comprises generating the environmental contextual data to represent user interactions with a group-based communication interface transmitted to the client device during a current communication session; and storing the environmental contextual data within a cache memory portion of the one or more non-transitory memory storage repositories; and wherein the environmental contextual data provided within the payload data is retrieved from the cache memory portion of the one or more non-transitory memory storage repositories.

In various embodiments, the processing actions included within the contextual processing action list are provided for display in ranked order based at least in part on the determined relevance scores. Moreover, the method may further comprise receiving data from the client device identifying one of a plurality of available processing action types; and wherein generating relevance scores comprises generating relevance scores for a plurality of processing actions of the identified processing action type. In certain embodiments, the environmental contextual data comprises one or more of: a current session identifier, an active group identifier, or an active channel identifier. In various embodiments, the processing actions included within the contextual processing action list comprise at least a first processing action executable by a first validated external resource and a second processing action executable by a second validated external resource. Moreover, transmitting the contextual processing action list to a client device may comprise causing the client device to generate an interface component to display the contextual processing action within a group-based communication interface. Moreover, at least one of the plurality of processing actions may be automatically generated based at least in part on historical data Various embodiments are directed to a system comprising: one or more non-transitory memory storage repositories, wherein the one or more non-transitory memory storage repositories comprise a processing action table identifying one or more processing actions; and one or more processors, wherein the one or more processors are collectively configured to: receive environmental contextual data generated for a client device, wherein the environmental contextual data comprises one or more of: a current session identifier, an active communication channel identifier, or an active group identifier; generate a contextual processing action list of one or more of the plurality of processing actions based at least in part on the environmental contextual data, wherein the contextual processing action list comprises at least a first processing action executable by a first validated external resource and a second processing action executable by a second validated external resource; and cause the client device to generate an interface element comprising the contextual processing action list for presentation via a group-based communication interface.

In certain embodiments, the one or more processors are further configured to: receive a selection of a processing action for initialization from a client device, wherein the processing action is selected from the contextual processing action list; generate a container comprising routing data and payload data, wherein the routing data identifies the processing action selected from the processing action table to be performed by an validated external resource and the payload data comprises at least a portion of the environmental contextual data; provide the container to the validated external resource to initialize the identified processing action based at least in part on the payload data.

In certain embodiments, the one or more processors are further configured to receive the environmental contextual data generated at the client device. In various embodiments, the one or more processors are further configured to: generate the environmental contextual data to represent user interactions with a group-based communication interface transmitted to the client device during a current communication session; and store the environmental contextual data within a cache memory portion of the one or more non-transitory memory storage repositories; and wherein the environmental contextual data provided within the payload data is retrieved from the cache memory portion of the one or more non-transitory memory storage repositories. Moreover, generating a contextual processing action list may comprise: identifying one or more available processing actions selected from the plurality of processing actions, wherein the one or more available processing actions are available to the client device based at least in part on the environmental contextual data; and selecting, from the one or more available processing actions, at least one processing action for inclusion with the contextual processing action list based at least in part on the environmental contextual data.

In certain embodiments, identifying one or more available processing actions is based on a first portion of the environmental contextual data; and selecting at least one processing action for inclusion with the contextual processing action list is based on a second portion of the environmental contextual data.

Another embodiment is directed to a computer-program product comprising at least one non-transitory computer-readable storage medium having computer-readable program code portions stored therein, the computer-readable program code portions comprising an executable portion configured to: receive environmental contextual data generated for a client device, wherein the environmental contextual data comprises one or more of: a current session identifier, an active communication channel identifier, or an active group identifier; generate a contextual processing action list of one or more of a plurality of processing actions based at least in part on the environmental contextual data, wherein the contextual processing action list comprises at least a first processing action executable by a first validated external resource and a second processing action executable by a second validated external resource; and cause the client device to generate an interface element comprising the contextual processing action list for presentation via a group-based communication interface.

In certain embodiments, the computer-readable program code portions further comprise an executable portion to: receive a selection of a processing action for initialization from a client device, wherein the processing action is selected from the contextual processing action list; generate a container comprising routing data and payload data, wherein the routing data identifies the processing action selected from the processing action table to be performed by an validated external resource and the payload data comprises at least a portion of the environmental contextual data; provide the container to the validated external resource to initialize the identified processing action based at least in part on the payload data.

In various embodiments, the computer-readable program code portions further comprise an executable portion to receive the environmental contextual data generated at the client device. Moreover, the computer-readable program code portions may further comprise an executable portion to: generate the environmental contextual data to represent user interactions with a group-based communication interface transmitted to the client device during a current communication session; and store the environmental contextual data within a cache memory portion of the one or more non-transitory memory storage repositories; and wherein the environmental contextual data provided within the payload data is retrieved from the cache memory portion of the one or more non-transitory memory storage repositories. In certain embodiments, generating a contextual processing action list comprises: identifying one or more available processing actions selected from the plurality of processing actions, wherein the one or more available processing actions are available to the client device based at least in part on the environmental contextual data; and selecting, from the one or more available processing actions, at least one processing action for inclusion with the contextual processing action list based at least in part on the environmental contextual data. In certain embodiments, identifying one or more available processing actions is based on a first portion of the environmental contextual data; and selecting at least one processing action for inclusion with the contextual processing action list is based on a second portion of the environmental contextual data.

Another embodiment is directed to a computer-implemented method comprising: receiving, via one or more processors, environmental contextual data generated for a client device, wherein the environmental contextual data comprises one or more of: a current session identifier, an active communication channel identifier, or an active group identifier; generating, via the one or more processors, a contextual processing action list of one or more of a plurality of processing actions based at least in part on the environmental contextual data, wherein the contextual processing action list comprises at least a first processing action executable by a first validated external resource and a second processing action executable by a second validated external resource; and causing, via the one or more processors, the client device to generate an interface element comprising the contextual processing action list for presentation via a group-based communication interface.

In various embodiments, the method further comprises receiving a selection of a processing action for initialization from a client device, wherein the processing action is selected from the contextual processing action list; generating a container comprising routing data and payload data, wherein the routing data identifies the processing action selected from the processing action table to be performed by an validated external resource and the payload data comprises at least a portion of the environmental contextual data; providing the container to the validated external resource to initialize the identified processing action based at least in part on the payload data.

In certain embodiments, the method further comprises receiving the environmental contextual data generated at the client device. Moreover, the method may further comprise generating the environmental contextual data to represent user interactions with a group-based communication interface transmitted to the client device during a current communication session; and storing the environmental contextual data within a cache memory portion of the one or more non-transitory memory storage repositories; and wherein the environmental contextual data provided within the payload data is retrieved from the cache memory portion of the one or more non-transitory memory storage repositories. In certain embodiments, generating a contextual processing action list comprises: identifying one or more available processing actions selected from the plurality of processing actions, wherein the one or more available processing actions are available to the client device based at least in part on the environmental contextual data; and selecting, from the one or more available processing actions, at least one processing action for inclusion with the contextual processing action list based at least in part on the environmental contextual data. In various embodiments, identifying one or more available processing actions is based on a first portion of the environmental contextual data; and selecting at least one processing action for inclusion with the contextual processing action list is based on a second portion of the environmental contextual data.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
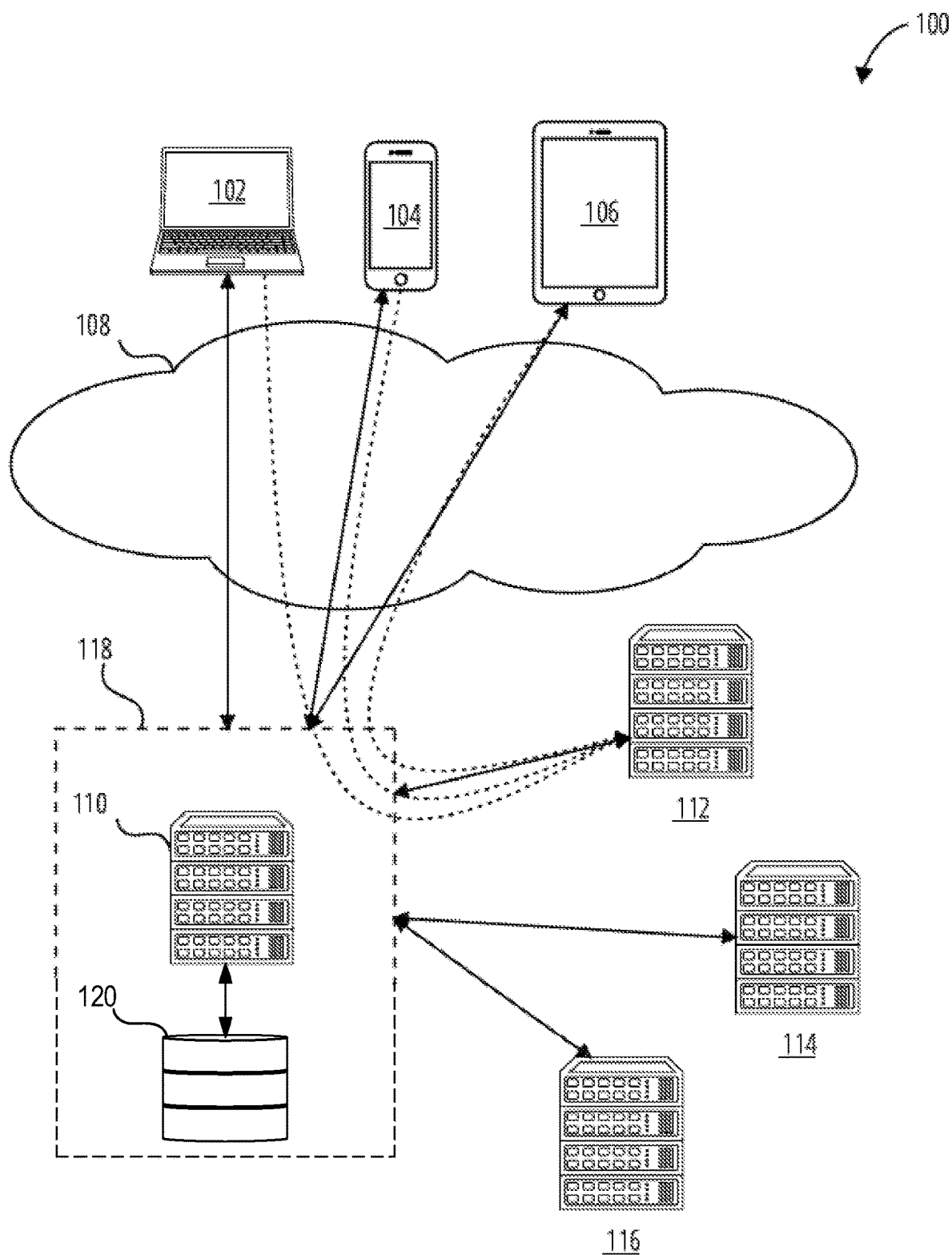
FIG. 1 illustrates a schematic view of a system 100 encompassing a group-based communication platform in communication with one or more client devices in accordance with one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Glossary

"Group identifier" in this context refers to one or more items of data by which a group within a group-based communication system may be identified. Group identifiers may also be referred to as "team identifiers" in certain embodiments. For example, a group identifier or team identifier may comprise ASCII text, a pointer, a memory address, and the like.

"User" in this context refers to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

"Sending user identifier" in this context refers to a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

"Routing data" in this context may identify various aspects of a processing action to be performed by a validated external resource on behalf of a requesting client device. The routing data may be utilized by the group-based communication system to appropriately route a container to an appropriate proxy endpoint to trigger a validated external resource to perform a particular processing action. The routing data may be further utilized by the validated external resource to identify the requested processing action to be performed and/or to identify any additional data that should be requested from the client device (e.g., via one or more interactive dialogs presented via a group-based user interface). Moreover, the routing data may identify various characteristics of a message object (e.g., a message, a file, a plurality of messages (e.g., all messages within a communication channel), and/or the like), such as a timestamp indicating when a particular message object was shared via the group-based communication platform, a sending-user identifier indicating a user (and/or client device) that initially shared the message object, a client token identifying the client device requesting the processing action, and/or the like.

"Client device" in this context refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

Client devices access the group-based communication platform via the network during "connection sessions" during which the client device maintains an active connection with the group-based communication platform for data transfer therebetween. A single connection session may encompass a continuous time period during which the client device maintains a connection with the group-based communication platform (e.g., between consecutive interruptions in connection, between consecutive occurrences of establishing and ending a connection, and/or the like). It should be understood that in certain embodiments, a connection session may continue between consecutive occurrences for establishing and ending a connection between a client device and the group-based communication platform, despite the inclusion of one or more short-duration interruptions, during which the client device and/or the group-based communication platform is configured to cache any data to be exchanged which is generated and/or retrieved during the short-duration interruption. While a connection session remains active, it may be referred to as a "current connection session." Once a current connection session ends (e.g., by termination of the connection between the client device and the group-based communication platform) the current connection session becomes a prior connection session. Connection sessions may have associated unique "session identifiers," thereby enabling a client device and/or the group-based communication platform to distinguish between a current connection session and prior connection sessions. These session identifiers may be alphanumeric strings (or other unique identifiers) that are unique to a particular session.

"User profile" in this context refers to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, and the like. The term user profile may be used interchangeably with "user account, and user account details." The user account details can include a subset designation of user credentials, such as, for example, login information for the user including the user's username and password.

"Contextual processing action list" in this context refers to a listing of available processing actions that may be presented to a user via a group-based communication interface displayable via a client device. The contextual processing action list of certain embodiments includes at least a subset (or all) of processing actions listed within a processing action table identifying processing actions available to a user under particular circumstances. The contextual processing action list may comprise a listing of processing actions performed by a single validated external resource, or the contextual processing action list may comprise a listing of processing actions performed by a plurality of validated external resources. In certain embodiments, the contextual processing action list of processing actions excludes certain processing actions to the user, such that the contextual processing action list of processing actions includes only a subset of all of the processing actions available to a user. For example, the contextual processing action list of processing actions may include a defined number of available processing actions (e.g., 5 processing actions) selected based on one or more display criteria. These display criteria may be identified based at least in part environmental contextual data as discussed herein (e.g., the processing actions displayed within the contextual processing action list may include processing actions available for messages having a particular sending user identifier, such as messages generated by a particular app; the processing actions displayed within the contextual processing action list may include processing actions available when requested from within a particular channel (e.g., such that the environmental contextual data comprises a channel identifier corresponding to the particular channel); the processing actions displayed within the contextual processing action list may include processing actions available when requested from within a particular group (e.g., such that the environmental contextual data comprises a group identifier corresponding to the particular group); and/or the like).

Moreover, the actions presented to a user within the contextual processing action list may be organized in accordance with one or more suggestion algorithms such that a most-suggested/recommended processing action is presented at a top of the contextual processing action list, and other alternative app actions may be presented lower (e.g., reflecting a lower priority) within the contextual processing action list.

"Operation servers" in this context refers to computing devices configured for interacting with various client devices for receiving and/or disseminating messages for distribution within communication channels. Operation servers may be configured to receive, store (in an associated database), and/or direct messages exchanged between users (operating via client devices). The functionality of the operation servers may be provided via a single server or collection of servers having a common functionality, or the functionality of the operation servers may be segmented among a plurality of servers or collections of servers performing subsets of the described functionality of the operation servers. For example, a first subset of operation servers may be configured for receiving messages from client devices and/or for transmitting messages to client devices (e.g., via one or more interface servers). These operation servers may be in communication with a second subset of operation servers configured for collecting messages distributed within communication channels and for storing those messages within a message repository database for indexing and archiving.

"Communication channel" in this context refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users. Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels. A communication channel may be "public," which may allow any client device to join and participate in the information sharing through the communication channel. A communication channel may be "private," which may restrict data communications in the communication channel to certain client devices and/or users.

"Payload data" in this context refers to data forming a portion of a container, as discussed herein. The payload data may comprise one or more messages (e.g., message text, files attached to an exchanged message, a plurality of discrete exchanged messages, and/or the like). In certain embodiments, the payload data may comprise environmental contextual data, and/or other data automatically selected for inclusion within the payload data for use by a validated external resource in executing a processing action.

"Interactive dialog" in this context refers to a user interface element configured to accept user input (e.g., as a selection of one or more of a plurality of available options, as freeform input, and/or the like). The dialog may be presented as a pop-up or an overlaid display element displayed visually over another portion of a user interface, or the dialog may be presented as a portion of a larger user interface element.

The term "validated external resource" refers to a software program, application, platform, or service that is configured to communicate with the group-based platform system and which service, manage, and/or perform actions that form various functions of an app that is accessible to a client device via a group-based communication interface. The validated external resource operates on a compiled code base or repository that is separate and distinct from that which supports the group-based communication platform. The validated external resource may comprise additional storage repositories (e.g., databases) associated with tasks, functions, and/or actions that may be performed via the validated external resource. In some embodiments, the validated external resource may communicate with the group-based communication platform, and vice versa, through one or more application program interfaces (APIs). In some embodiments, the validated external resource receives tokens or other authentication credentials that are used to facilitate secure communication between the validated external resource and the group-based communication platform in view of group-based communication platform network security layers or protocols (e.g., network firewall protocols). As various examples, a validated external resource may be configured for executing a calendaring/scheduling app, a to-do list app, a service provider app, a software testing app, a storage repository app, and/or the like.

"Data" in this context refers to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

"Client token" in this context refers to an identifier that uniquely identifies a particular client device. The client tokens may be static (e.g., such that a client device is permanently associated with a particular client token until an affirmative action is taken to change the associated client token) or dynamic (e.g., such that a client token is assigned to a particular client device for a short duration, such as the period of time associated with performing a particular task, the period of time associated with a unique connection session between the client device and a group-based communication platform, and/or the like). Moreover, client tokens may be encrypted in certain embodiments utilizing any of a variety of encryption methodologies for added security against unauthorized usage of the client token.

"Private group-based communication channel" in this context refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Group-based communication platform" in this context refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows. Group-based communication platform users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier). Group-based communication system users may join and/or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

"Environmental contextual data" in this context refers to data indicative of a user's interaction with a group-based communication interface at the time of, or immediately prior to the request of a processing action. As discussed in greater detail herein, such environmental contextual data may refer to a graphical interface from which the user requests execution of a processing action (e.g., a graphical interface associated with a particular communication channel; a graphical interface associated with a particular group, a graphical interface associated with a particular validated external resource, and/or the like); a history of graphical interfaces visited (e.g., during a current connection session or spanning multiple connection sessions) prior to arriving at the current graphical interface from which the user requests execution of the processing action, and the route taken between those graphical interfaces before the user requests execution of a processing action; the identity and/or characteristics of users, messages, and/or other objects visible to the user in a graphical user interface from which execution of a processing action is requested (e.g., the content of the graphical interface displayed to the user); and/or the like. In this regard, environmental contextual data may comprise a listing, table, or other data structure comprising one or more user identifiers, session identifiers, active channel identifiers (indicative of a channel currently being viewed by a user (via a client device), active group identifiers (indicative of a group currently being viewed by a user (via a client device)), one or more prior channel identifiers (indicative of one or more channels viewed during the current connection session and/or prior connection sessions); one or more validated external resource identifiers, and/or the like. The environmental contextual data may comprise additional identifying data as well, such as time stamps, dates, user identifiers with whom the user has corresponded with (e.g., a most-recently contacted user), and/or the like. Environmental contextual data is generated and/or collected by the group-based communication platform and/or a client device. The environmental contextual data may be stored in a cache memory storage area in certain embodiments, which may be cleared upon the occurrence of certain events (e.g., the elapsing of a defined period of time from the generation of the environmental contextual data; the generation of a defined amount of newer-generated environmental contextual data; closing an app on the client device associated with the group-based communication platform; and/or the like).

"Historical data" may supplement the environmental contextual data in certain embodiments. In certain embodiments, the historical data is indicative of environmental contextual data (and/or routing data) deemed relevant for execution of a processing action under similar, historical circumstances (occurring during a prior interaction between a client device and the group-based communication platform (e.g., during a prior connection session)). For example, the historical data may indicate which processing actions are generally selected by one or more users during similar circumstances; which environmental contextual data is relevant for a processing action under similar circumstances; and/or the like. The historical data may encompass user historical data that is unique to a particular user, and identifies how that particular user has interacted with the group-based communication platform in the past. In certain embodiments, the historical data encompasses universal historical data, which identifies how a plurality of users have generally interacted with the group-based communication platform in the past under similar circumstances. In accordance with certain embodiments, the similar circumstances are determined and/or monitored via artificial intelligence and/or machine learning algorithms which monitor generated environmental contextual data and a user's resulting interaction with the group-based communication platform under the circumstances of the generated environmental contextual data. This historical data may be consolidated and/or summarized into characteristics of the processing action and/or environmental contextual data deemed most relevant to a particular user under the particular circumstances.

"Processing action" in this context refers to an executable action performed by a validated external resource (e.g., an app accessible via the group-based communication platform). The processing action may be embodied as a data generation process, a data manipulation process, and/or the like that is performed based at least in part on data included within a container provided from the group-based communication platform to the validated external resource. In certain embodiments, the data provided for execution of the processing action comprises routing data (e.g., which identifies the validated external resource and/or the processing action to be executed) and payload data, which encompasses substantive data for which the processing action is executed. In certain embodiments, the payload data comprises a message or other object and/or encompasses environmental contextual data, as described herein, to be utilized in executing the processing action. However, it should be understood that in certain embodiments, the payload data may be minimal (or empty), for processing actions not requiring an input for execution. As various examples, a processing action may be the creation of a calendar object (e.g., via a scheduling app), the creation of a "to-do" item (e.g., via a productivity app), the creation of a service ticket (e.g., via a service app), the creation of a bookmark (e.g., via a link compilation app), the creation of a file (e.g., via a document editing app), the initiation of a call (e.g., via a video conferencing app), and/or the like.

In certain embodiments, processing actions may be embodied as one of a plurality of processing action types. For example, processing actions may comprise global processing actions, channel processing actions, message processing actions, object processing actions, and/or the like. As utilized herein, "global processing actions" are requested by a user as not being dependent on a particular channel, message, object, and/or the like. Global processing actions may be requested, for example, via a group-based communication interface menu (e.g., a file menu associated with the group-based communication interface displayed via a client device). As a non-limiting example, a global processing action may be the generation of a task item that is personal to a user.

As used herein, a "channel processing action" refers to a processing action that is dependent on the content of a particular communication channel. For example, channel processing actions may be utilized for disseminating the result of a processing action to all (or some portion) of the members of a particular communication channel. As another example, channel processing actions may utilize multiple messages exchanged within a communication channel as input (e.g., as payload data of a request for initiation of the processing action). Channel processing actions may be requested, for example, via a channel-specific menu (e.g., a menu adjacent to and/or associated with a user input portion for sharing messages and/or other objects within the channel).

As used herein, "message processing actions" may be requested for initiation with respect to a particular message. The message associated with particular message processing actions may be provided as payload data with the request. As an example, message processing actions may encompass generating a task item for a particular user to address some content of a particular message. Message processing actions may be requested, for example, via a message-specific menu (e.g., a menu accessible via a graphical user interface element located adjacent a particular message).

As used herein, "object processing actions" may be requested for initiation with respect to a particular object. The object associated with the particular object processing action may be provided as payload data with the request. As an example, object processing actions may encompass generating a task item for a particular user to address some attribute of a particular object. Object processing actions may be requested, for example, via an object specific menu (e.g., a menu accessible via a graphical user interface element located adjacent a particular object).

In certain embodiments, each processing action type may be requested via discrete user interface elements presented to a user as a part of a group-based communication interface. In certain embodiments, user interface elements associated with each of the processing action types may be presented simultaneously to the user as a part of the group-based communication interface. For example, a first user interface element corresponding to global processing actions may be presented to a user as a part of a global menu bar; a second user interface element corresponding to channel processing actions may be presented to a user as a part of a channel menu bar; a third user interface element corresponding to message processing actions may be accessible at and/or adjacent to each displayed message; a fourth user interface element corresponding to object processing actions may be presented at and/or adjacent to each displayed object.

Processing actions available to a user for various circumstances (e.g., within a particular channel, within a particular group, and/or the like) are identified in certain embodiments within corresponding "processing action tables." Processing action tables identify processing actions available for a user. The identified processing actions within processing action tables may be updated under various circumstances, such as when new processing actions are installed/uninstalled and/or otherwise made available/unavailable to a user. As noted above, contextual processing action lists of processing actions recommended to a particular user may encompass a subset of all those processing actions listed within a processing action table for a particular user.

"Container" in this context refers to a collection of individual data elements that may be transmitted between a plurality of computing entities collectively, such that the included data remains associated therewith. The container may be configured to store data therein with a standardized formatting, such that computing entities may be configured to automatically determine the type of data stored within the container. For example, a container may comprise substantive data to be passed between computing entities stored within a payload of the container, and the container may comprise metadata associated with the generation of the container that is stored within a routing data portion of the container.

"File object" in this context refers to an example of a message that may be provided as payload data within a container to a validated external resource to perform a requested processing action. A file object may be any of a variety of executable file types, such as a ".pdf" file, a ".docx" file, a ".xml" file, a ".html" file, a ".tp" file, and/or the like.

"Channel identifier" in this context refers to one or more items of data by which a group-based communication channel may be identified. Channel identifiers may also be referred to as "group-based communication channel identifiers" in certain embodiments. For example, a group-based communication channel identifier may comprise ASCII text, a pointer, a memory address, and the like.

"Message" in this context refers to electronically generated digital content objects provided by a user using a client device and that is configured for exchange and display within a group-based communication channel interface. Messages may also be referred to as "messaging communications" in certain embodiments. Messages may include or be embodied as any text, image, video, audio, files, interactive links, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

"Group-based communication channel interface" in this context refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

"Proxy endpoint" in this context refers to a data transfer interface, for example an Application Program Interface (API) between unconnected computing systems via a network. The proxy endpoint may be accessible over the network via a URL. For example, a proxy endpoint may enable data transfer of a container (comprising routing data and/or payload data) from a group-based communication system to a validated external resource associated with an app published and usable via the group-based communication system. In various embodiments, the proxy endpoint is defined at least in part by a URL accessible to the validated external resource, wherein the URL may be utilized to direct the validated external resource to a particular dataset (e.g., one or more containers). As discussed herein, containers provided to the validated external resource via the proxy endpoint may comprise data formatted to enable usage by the validated external resource to perform a desired processing action. The proxy endpoint enables transfer of the container data to the validated external resource while maintaining the necessary formatting of the container to enable the validated external resource to use the included data. Moreover, in certain embodiments the proxy endpoint enable real-time transmission of data to the validated external resource (e.g., via push-based message transmission). In other embodiments, the proxy endpoint may be configured to enable the validated external resource to pull data from the group-based communication platform (e.g., upon the occurrence of a trigger event acting to inform the validated external resource of the presence of data that is ready for transmission).

Overview

As discussed herein, certain embodiments are directed to systems and methods enabling a group-based communication platform to determine appropriate actions to be performed by one or more validated external resources. These actions may be performed at least partially in accordance with the systems and methods described in U.S. patent application Ser. No. 16/206,542, filed on Nov. 30, 2018, the contents of which are incorporated herein by reference in their entirety.

Such configurations enable users of the group-based communication platform to initiate processing actions within one or more validated external resources based on commands and/or processes performed within a group-based communication interface of the group-based communication platform. For example, messages, files, threads, groups of messages, and/or other objects and/or data generated by and/or usable within the group-based communication platform may be exported from the group-based communication platform and automatically imported into one or more validated external resources to generate various objects usable within those validated external resources. For example, messages exchanged via the group-based communication platform may be provided to validated external resources to create and populate applicable to-do list items, to generate and populate one or more documents, and/or the like.

To ease a user's selection of a processing action for execution, the group-based communication platform (and/or a client device in electronic communication with the group-based communication platform) utilizes environmental contextual data regarding the particular user's activities with the group-based communication platform (e.g., during a current connection session and/or during a plurality of connection sessions) to determine suggested/recommended processing actions for the user that may be displayed to the user. For example, the user interface displayed to the user when the user requests a processing action, the time-of-day/day-of-week when the user requests a processing action, the user's most recent correspondence when the user requests a processing action, and/or the like, may be utilized to determine one or more suggested processing actions to be made available to the user.

Moreover, to facilitate the user's entry of data to be utilized to execute the processing action, the group-based communication platform (and/or a client device in electronic communication with the group-based communication platform) may automatically retrieve and/or populate one or more necessary data fields of a container payload portion to be provided to the validated external resource for execution of the processing action. For example, the group-based communication platform and/or client device may be configured to retrieve various portions of the environmental contextual data discussed above, and/or other data relating to the user to provide to the validated external resource to aid in execution of the processing action.

The group-based communication platform is configured to provide data to the validated external resources within defined containers, wherein each container comprises routing data indicative of the message, file, or other object for which the container was generated (if relevant), a timestamp associated with the creation of the object, a client device token identifying the requesting client device, a validated external resource (e.g., an app) to which the container is to be directed, and/or an action to be performed by the validated external resource. The container further includes a payload portion comprising substantive data to be utilized for the execution of the processing action. For example, the payload portion may comprise the object itself (e.g., the message, file, and/or the like) for which the processing action is to be executed, environmental contextual data relevant for the execution of the processing action, and/or the like. Ultimately, the data included within the container is passed to the validated external resource, for example, using an API to provide the data to the validated external resource in the appropriate format to execute the requested action.

If additional data is necessary to execute the processing action, the group-based communication platform utilizes the client token passed to the validated external resource to identify an appropriate client device and presents a dialog to collect additional information to be utilized by the validated external resource to perform the requested processing action. The dialog may be retrieved from a separate dialog storage area (e.g., stored in association with the group-based communication platform) accessible via a dialog API. The request message may, in certain embodiments, comprise a dialog trigger identifier that may be presented to the dialog storage area via the dialog API. In return, an appropriate dialog corresponding to the dialog trigger identifier and having appropriate fields for presentation to a user is retrieved. For example, the dialog may comprise a plurality of alternatively selectable options (those options being available within the validated external resource) for use with the requested action. Various data generated and/or otherwise provided via the dialog are provided back to the validated external resource and associated with the original container presented thereto. Upon successfully providing data to the validated external resource, the group-based communication platform provides a confirmation to the client device (e.g., as a separate notification icon and/or via a message provided via the group-based communication interface). Other methodologies for collecting additional necessary data for execution of a processing action may be utilized. For example, command line style text entries may be provided to a user interface field (e.g., a user interface field utilized to generate messages for sharing within a channel) to provide additional necessary data for execution of a processing action, via a user utilizing an identifier and/or particular syntax to denote that text entries are to be treated as input to be included within a container of a processing action. In certain embodiments, one or more processing actions may have a corresponding identifier and/or syntax that may be utilized to initiate the processing action via command line style prompts (instead of, or in addition to, graphical menu options for initiating a processing action).

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which embodiments of the present invention may operate. Users may access a group-based communication platform 118 via a communication network 108 using client devices 102-106.

Communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, an 802.11, 802.16, 802.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 118 includes an at least one operation server(s) 110 accessible via the communication network 108. Collectively, the at least one operation server(s) 110 is configured for receiving messages transmitted from one or more client devices 102-106, storing the messages within database storage areas for individual communication channels, and/or for transmitting messages to appropriate client devices 102-106. Moreover, the group-based communication platform 118 encompasses one or more database storage areas 120, which may define one or more cache memory storage areas and/or one or more long term storage areas, such as for storing historical data utilized for executing one or more models as discussed herein.

The client devices 102-106 may be any computing device as defined above. Electronic message data exchanged between the operation server(s) 110 and the client devices 102-106 may be provided in various forms and via various methods.

In some preferred and non-limiting embodiments, one or more of the client devices 102-106 are mobile devices, such as smartphones or tablets. The one or more client devices may execute an "app" to interact with the operation server(s) 110. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 102-106, these client devices 102-106 are configured for communicating with the group-based communication platform 118.

In some preferred and non-limiting embodiments, the client devices 102-106 may interact with the operation server(s) 110 via a web browser. The client devices 102-106 may also include various hardware or firmware designed to interact with the operation server(s) 110. Again, via the browser of the client devices 102-106, the client devices 102-106 are configured for communicating with the group-based communication platform 118.

In some embodiments of an exemplary group-based communication platform 118, a message or messaging communication may be sent from a client device 102-106 to a group-based communication platform 118. In various implementations, messages may be sent to the group-based communication platform 118 over communication network 108 directly by one of the client devices 102-106. The messages may be sent to the group-based communication platform 118 via an intermediary such as a message server, and/or the like. For example, a client device 102-106 may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., file objects), message hierarchy data (e.g., the message may be a reply to another message), third party metadata, and/or the like. In one embodiment, the client device 102-106 may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
```

```
        //sources, further messages will include only on to save
        //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
</client_details>
<client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
</client_details>
<client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
</client_details>
<message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent
policy.</contents>
    <attachments>patent_policy.pdf</attachments>
</message>
</auth_request>
```

In the illustrated embodiment, the group-based communication platform 118 comprises a plurality of operation server(s) 110 configured to receive messages transmitted between a plurality of client devices 102-106 within a channel identified by a channel identifier and/or a group identifier, and to facilitate dissemination of those messages among client devices 102-106 that collectively form the membership of the communication channel.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
    FROM MSM_Message
    WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, file objects may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the operation servers 110). Metadata associated with the message may be determined and the message may be indexed in the operation server(s) 110. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the operation server(s) 110 to facilitate searching. In one embodiment, the files may be indexed such that a company's or a group's files are indexed at a separate distributed repository. Similarly, as discussed herein, app data associated with various validated external resources and/or processing actions may be stored in association with a particular group's messages, such that app data associated with a plurality of groups are stored separately.

Examples of electronic message exchange among one or more client devices 102-106 and the group-based communication platform 118 are described below in reference to FIG. 1.

As shown in FIG. 1, the group-based communication platform 118 enables individual client devices 102-106 to exchange objects (e.g., messages) with one another and to interact with one or more validated external resources 112-116. To exchange messages and/or other objects between client devices 102-106, individual client devices 102-106 transmit messages (e.g., text-based messages, file objects, video and/or audio streams, and/or the like) to the group-based communication platform 118. Those messages are ultimately provided to one or more operation server(s) 110, which indexes the messages and distributes those messages to the intended recipients (e.g., client devices 102-106) of the message.

In accordance with the embodiment shown in FIG. 1, the client devices 102-106 are configured to display the received messages in a contextually-relevant user interface available to the user of the client device. For example, messages transmitted from a first client device 102 as a part of a group-based communication channel are displayed in a user interface display on client devices 102-106 associated with other members of the group-based communication channel.

As discussed in greater detail herein, messages, other objects, and/or other data may be provided to validated external resources 112-116 to initiate one or more processing actions executable within the respective validated external resource. In certain embodiments, those processing actions are made available to client devices 102-106 on a group-basis (e.g., such that individual processing actions are available to every member of a particular group), on a communication channel basis (e.g., such that individual processing actions are available to every member of a particular communication channel), on an individual basis (e.g., such that individual processing actions are available to certain individual client devices 102-106), on a sending user identifier basis (e.g., such that individual processing actions are available only for certain messages transmitted by particular users, such that the message is associated with a particular sending user identifier), and/or the like. As an added limitation, certain processing actions may only be executable via client devices 102-106 that are directly authenticated with a particular validated external resource configured to execute the processing action (as indicated by the dashed lines between the individual client devices 102-106 and example validated external resource 112).

The processing actions may be made available by the validated external resource 112 based on developer interaction with the group-based communication platform 118 setting access limitations for the processing actions. Those processing actions may comprise one or more discrete functions provided by the validated external resource. For example, a single function of the validated external resource may be called via the processing actions, or a plurality of processing actions, collectively considered a workflow characterized by passing input and/or output between each of the plurality of functions, may define a processing action. In certain embodiments, a workflow may rely on one or more functions performed by the group-based communication platform to begin a workflow, to end a workflow, and/or between other functions of a workflow. For example, a workflow may comprise functions performed by the validated external resource 112 to generate an output passed back to the group-based communication platform 118, that output causing the group-based communication platform 112 to execution one or more additional functions, which may be utilized by one or more additional functions of the validated external resource 112.

In certain embodiments, a developer associated with the validated external resource 112 may provide user input to the group-based communication platform identifying the availability of one or more processing actions and/or identifying the processing action type to thereby enable the group-based communication platform to determine how the processing action is to be made available to users. For example, user input may specify that a particular processing action is a message processing action, to be made available to users via message-specific menus.

Example Apparatuses Utilized with Various Embodiments

Figure 2:
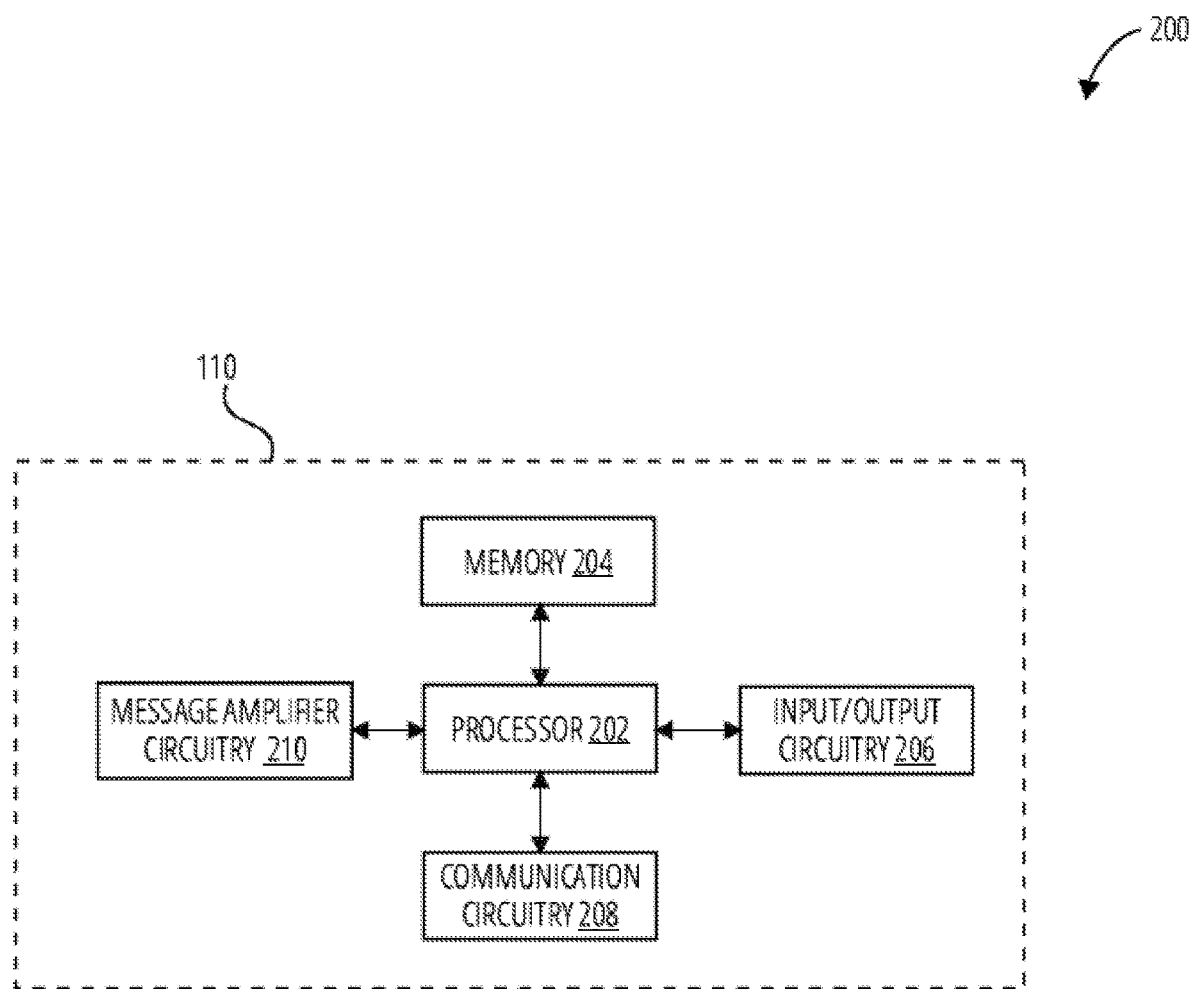
FIG. 2 illustrates an apparatus 200 of an operation server(s) 110 in accordance with one embodiment.

Each operation server(s) 110 may be embodied by one or more computing systems, such as apparatus 200 shown in FIG. 2. The apparatus 200 may include processor 202, memory 204, input/output circuitry 206, communications circuitry 208, and message amplifier circuitry 210. The apparatus 200 may be configured to execute the operations described herein with respect to FIG. 3-FIG. 8. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 102-106 to enable message sharing therebetween. The processor 202 ensures that messages intended for exchange between the client devices 102-106 within the particular communication channel are properly disseminated to those client devices 102-106 for display within respective display windows provided via the client devices 102-106.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 102-106.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communication circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communication circuitry 208 may include, for example, a network interface for enabling communications with a wired or wireless communication network. For example, the communication circuitry 208 may include one or more network interface cards, antennae, buses, switches, routers, modems, and supporting hardware and/or software, or any other device suitable for enabling communications via a network. Additionally or alternatively, the communication circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices 102-106 to other client devices 102-106 based on database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus 200 configured by either hardware or software for implementing these planned functions.

It is also noted that all or some of the information discussed herein can be based on data that is received, generated and/or maintained by one or more components of apparatus 200. In some embodiments, one or more validated external resources (such as a remote cloud computing and/or data storage system) may also be leveraged to provide at least some of the functionality discussed herein.

The term "circuitry" should be understood broadly to include hardware and, in some embodiments, software for configuring the hardware. With respect to components of each apparatus 200, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communication circuitry 208 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform 118 may comprise one or more databases configured for storing and/or indexing messages exchanged within various group-based communication channels.

Figure 3:
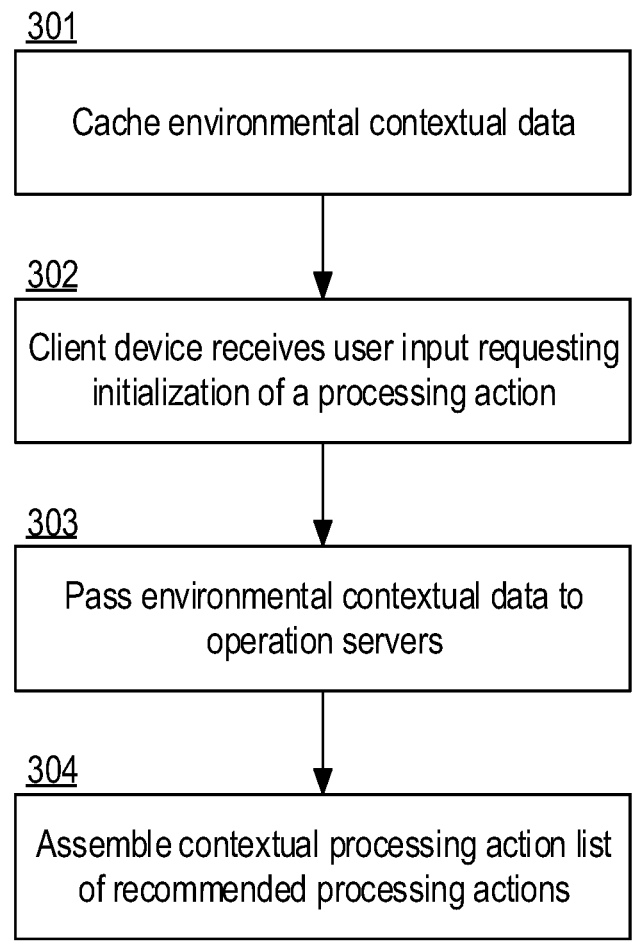
FIG. 3 is a flowchart illustrating example steps for generating a contextual processing action listing of recommended processing actions for a user.
Figure 4:
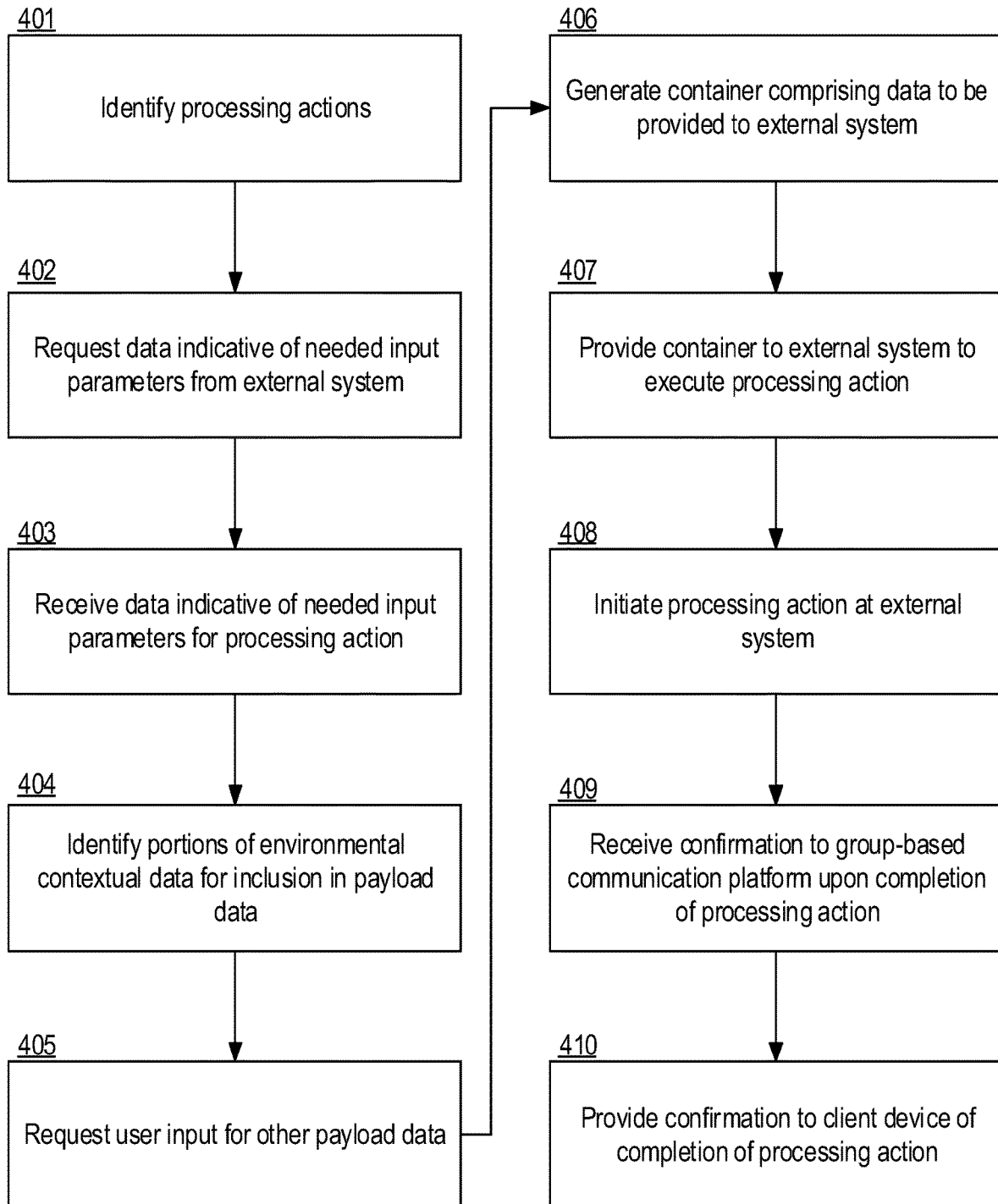
FIG. 4 is a flowchart illustrating example steps for initializing execution of a processing action based at least in part on environmental contextual data.
Figure 5A:
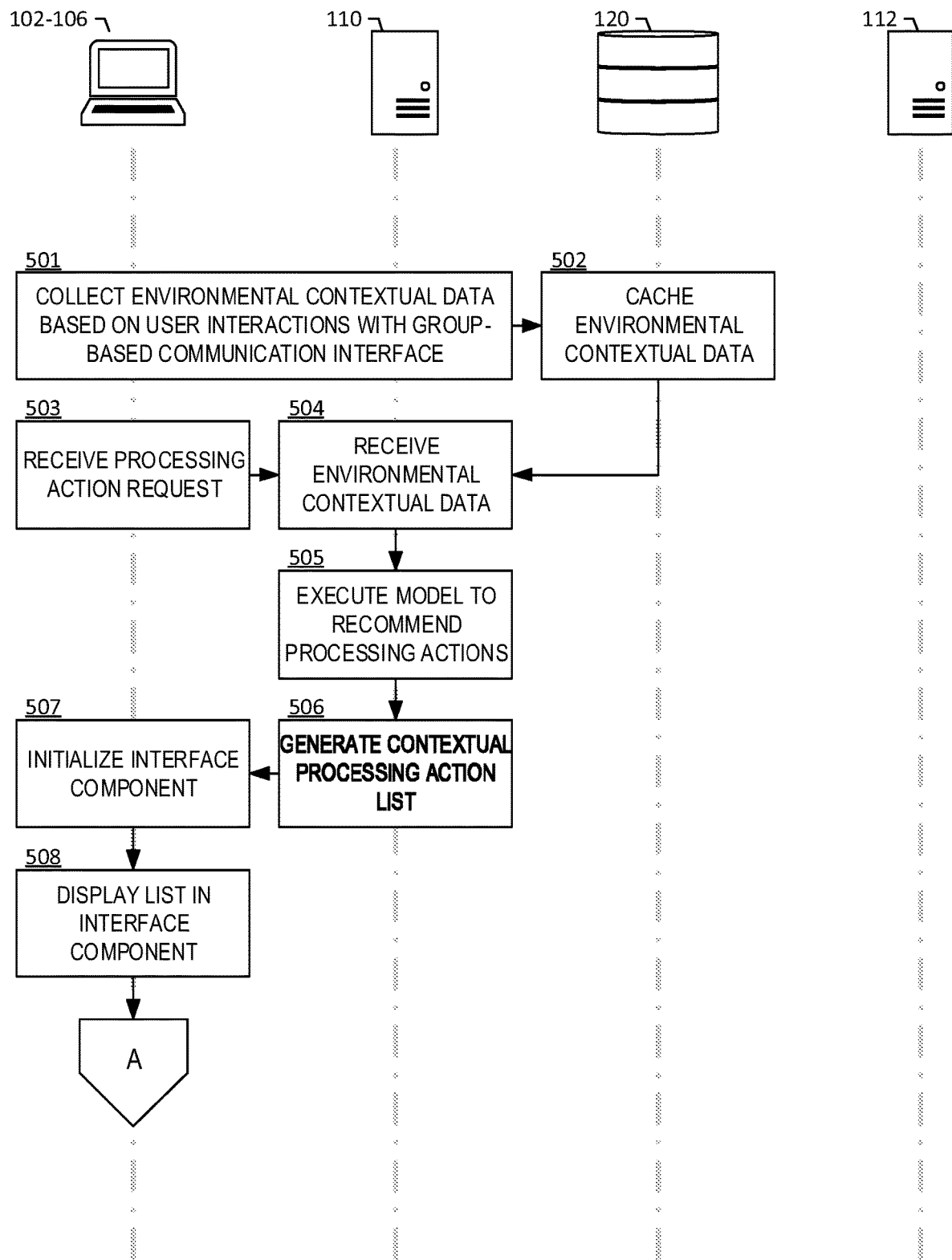
FIGS. 5A-5C illustrate a lane diagram showing functionality of various components in accordance with various embodiments.
Figure 5B:
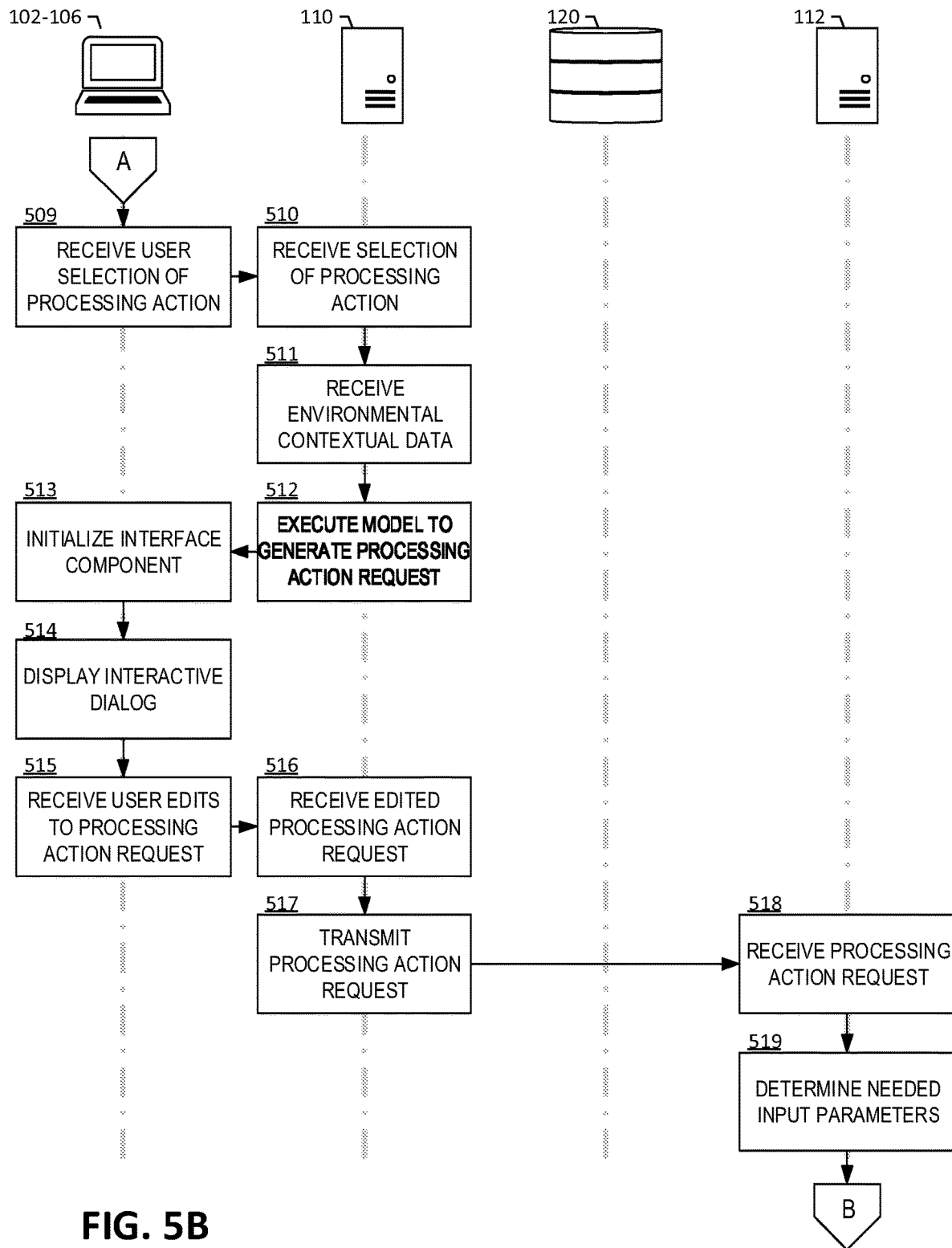
Figure 5C:
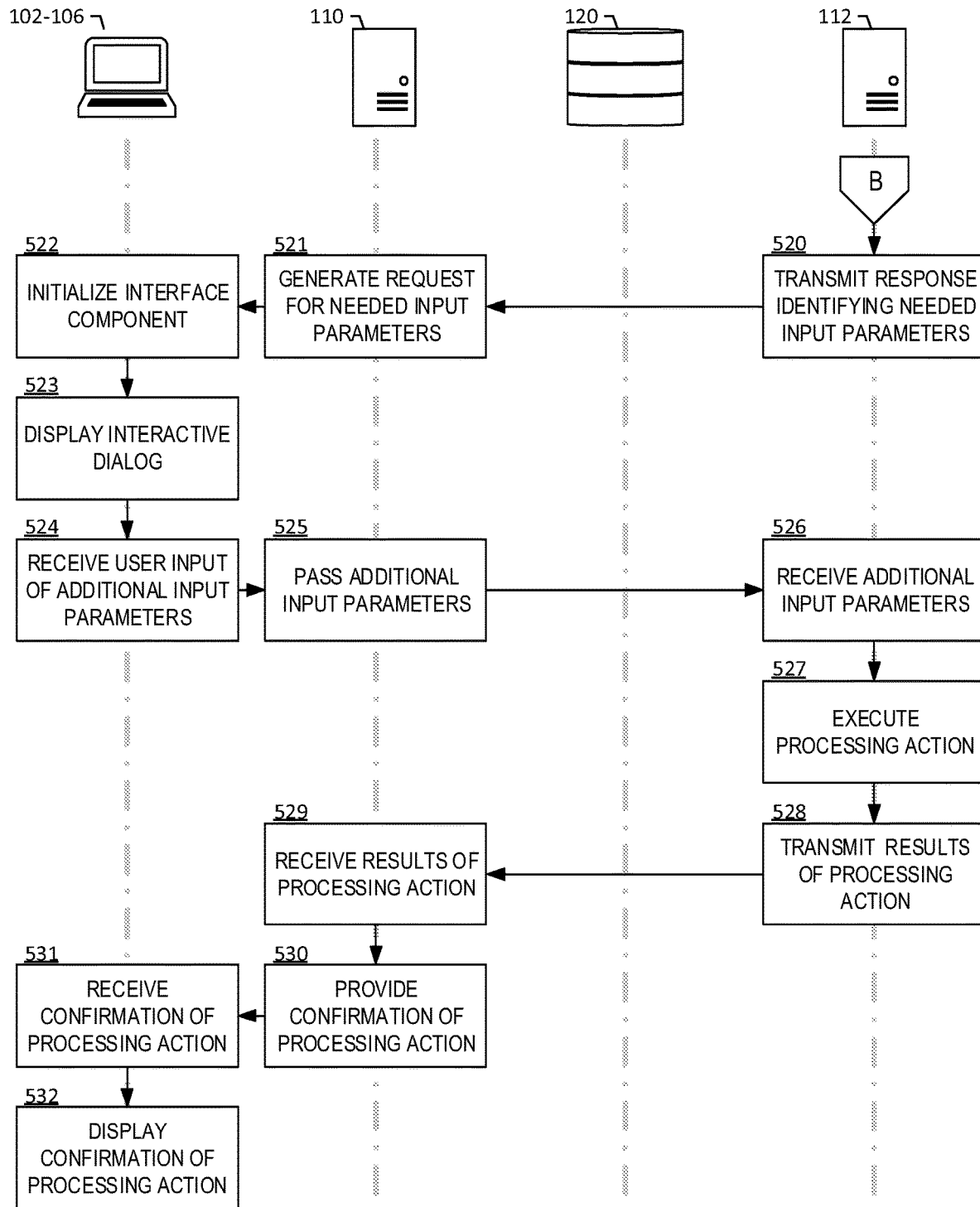
Figure 6:
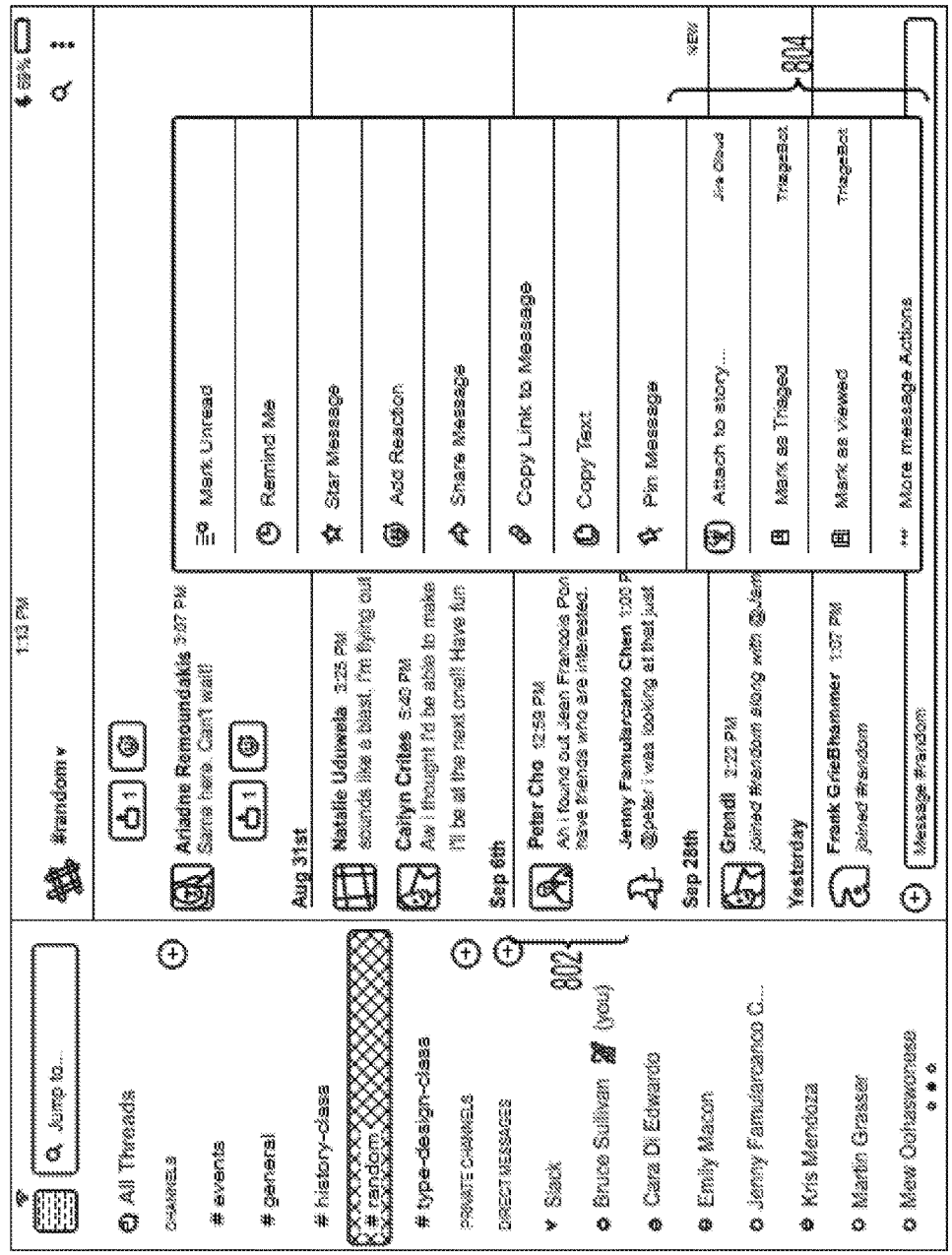
FIG. 6 shows an example group-based communication interface providing a contextual processing action list.
Figure 7:
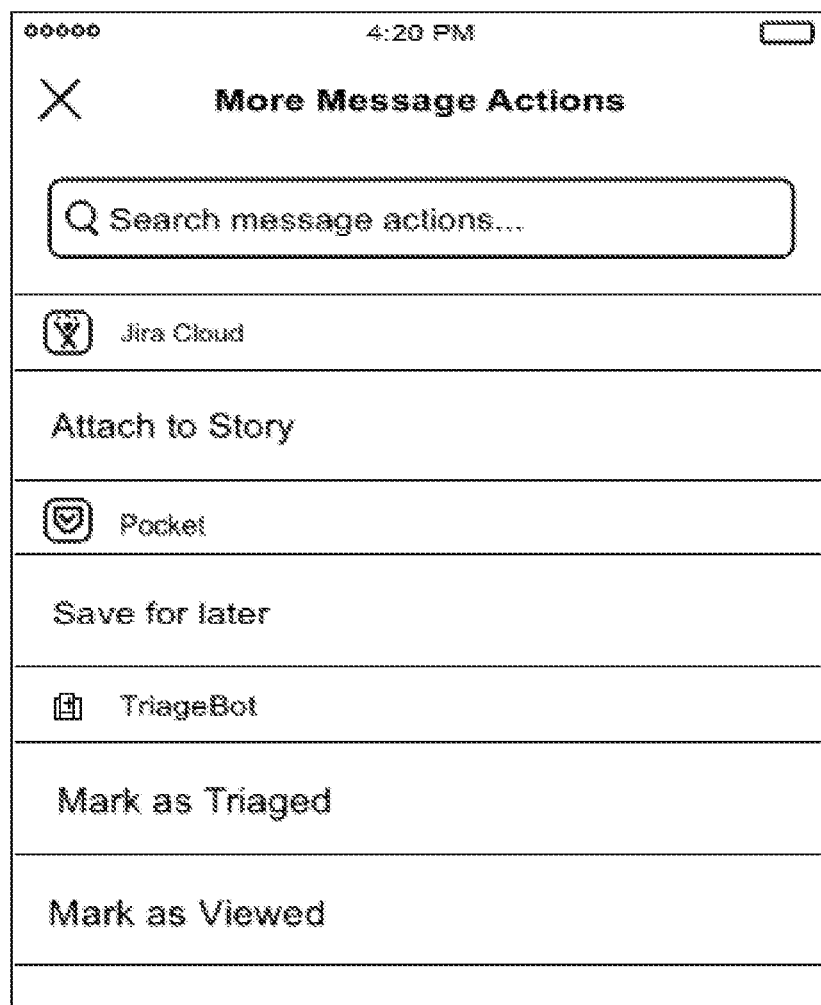
FIG. 7 shows another example group-based communication interface providing a contextual processing action list.
Figure 8:
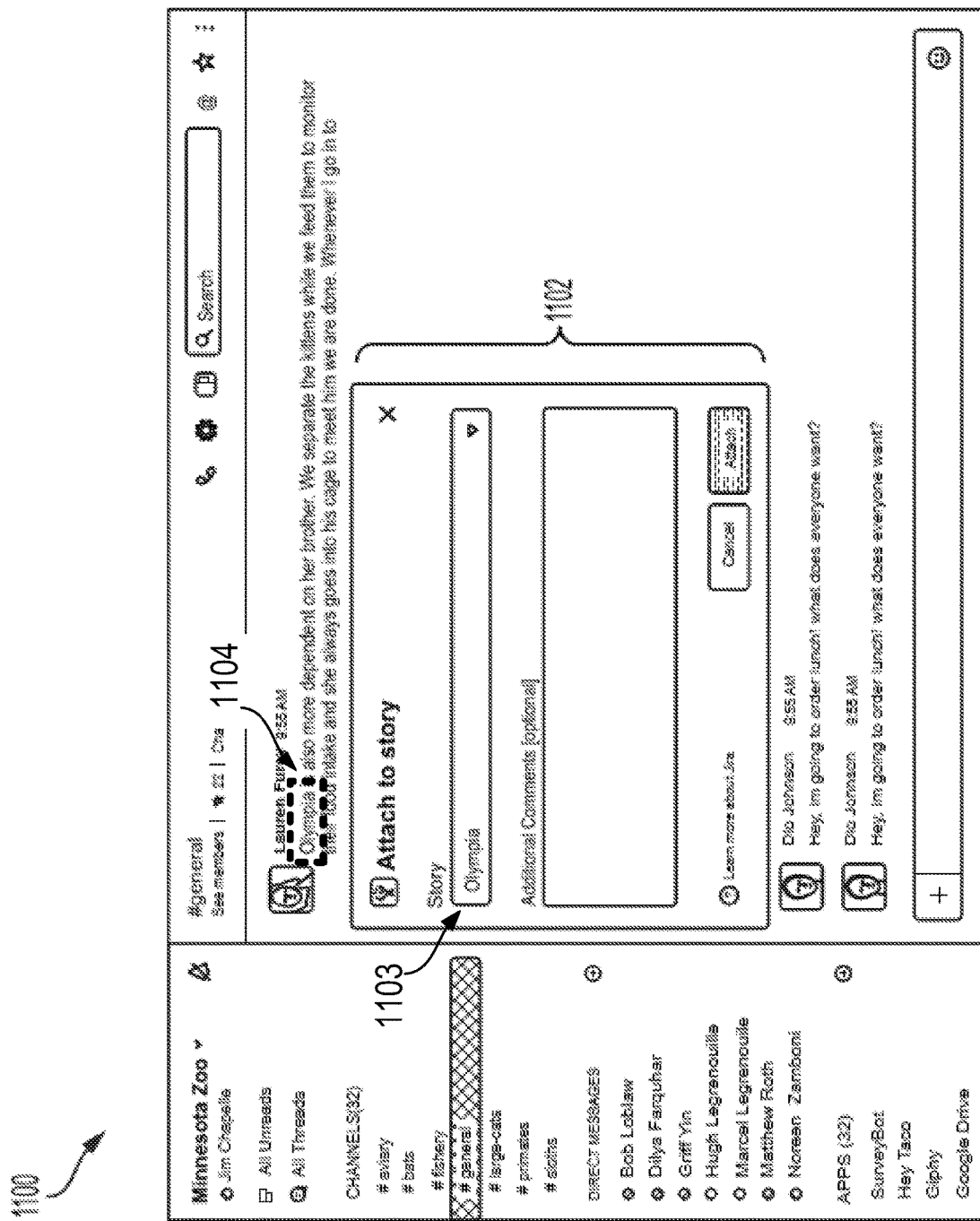
FIG. 8 shows an example group-based communication interface providing a partially pre-populated interactive dialog having at least a portion of environmental contextual data.

FIGS. 3-4 provide flowcharts illustrating various processes performed in accordance with various embodiments, while FIGS. 5A-5C collectively provide a lane-diagram data flow illustrating the functionality of various components in performing particular aspects of the processes discussed herein. FIGS. 6-8 illustrate example wireframes illustrating implementation details of certain embodiments.

Example Data Flows

Determining Environmental Contextual Data

As noted above, environmental contextual data is indicative of a user's interaction with a group-based communication platform 118 at the time the user requests execution of a processing action. The environmental contextual data of certain embodiments is generated and/or collected at least in part by the group-based communication platform 118 and/or the client device, as reflected at Block 501 of FIG. 5A.

In certain embodiments, environmental contextual data is generated and/or collected based at least in part on data utilized to generate a group-based communication interface to be presented to a user via a client device 102-106. The environmental contextual data encompasses current environmental contextual data indicative of a current display provided to a user via a client device (e.g., embodied as an active channel identifier stored as at least a portion of the environmental contextual data for a particular user and/or client device), and/or prior environmental contextual data indicative of immediately prior displays provided to the user (e.g., that a user navigated through to reach the current display, which may be embodied as one or more prior channel identifiers (and/or associated time stamps) stored as at least a portion of the environmental contextual data for a particular user and/or client device). Moreover, as noted, the environmental contextual data may be stored in a cache memory storage area (associated with a database storage area 120 in communication with the operation servers 110 as reflected at Block 502 of FIG. 5A; or embodied as a memory storage area of the client device 102-106), such that the environmental contextual data may reflect both current environmental contextual data and prior environmental contextual data.

As just one example, environmental contextual data encompasses data indicative of a group-specific graphical user interface from which the user initiated a processing action request (which may be embodied as an active group identifier stored as at least a portion of the environmental contextual data). As a specific example, the group-specific graphical interface may be a home-page associated with the group, a group-wide messaging interface, and/or any graphical interfaces associated with a particular group (e.g., a graphical interface associated with a communication channel having one or more members (e.g., individual users) who are associated with the group). As noted above, certain processing actions (e.g., all processing actions associated with a particular verified external resource, a subset of processing actions associated with a particular verified external resource, and/or a combination of processing actions associated with different verified external resources) are available on a group-basis, such that certain processing actions may be made available for members of a particular group. Moreover, as discussed in greater detail herein, the environmental contextual data indicative of the identity of a particular group may be usable to determine one or more relevant processing actions for a particular set of circumstances. For example, users associated with a particular group may be most-likely to utilize a determined processing action when presented with a particular graphical interface.

Moreover, as mentioned above, the environmental contextual data may be accompanied by and/or supplemented by historical data indicative of prior activities of a plurality of users when presented with circumstances similar to current circumstances under which a processing action is requested. Such historical data may be stored within a database storage area 120 in communication with the group-based communication platform 118. As just one example, historical data indicative of processing actions utilized by other members of a particular group may be informative of a likely processing action (and/or data to be included within payload data in accordance with the requested processing action) to be requested by a particular user.

As another example, the environmental contextual data may encompass data indicative of a channel-specific graphical user interface from which the user initiated a processing action request. As noted above, certain processing actions are available on a channel-basis, such that certain processing actions may be made available for users only when accessed from within the particular channel (and/or only for messages or other objects exchanged within the channel). Moreover, as discussed in greater detail herein, the environmental contextual data indicative of the identity of a particular channel from which the processing action is initiated (e.g., an active channel identifier) may be usable to determine one or more relevant processing actions for a particular set of circumstances. For example, users associated with or working within a particular channel may be most-likely to utilize a determined processing action when presented with a particular graphical interface.

Moreover, to the extent environmental contextual data is accompanied by and/or supplemented by historical data indicative of prior activities of a plurality of users, the historical data may be indicative of processing actions utilized by other members of a particular channel when requesting a processing action from the particular channel. As just one example, historical data indicative of processing actions utilized by other users within a particular communication channel may be informative of a likely processing action (and/or data to be included within payload data in accordance with the requested processing action) to be requested by a particular user.

The environmental contextual data in certain embodiments comprises data indicative of the identity of a user requesting the initiation of a processing action. As mentioned above, the environmental contextual data may be accompanied by, and/or supplemented by historical data indicative of prior activities of the user. Thus, the identity of the user is utilized in accordance with certain embodiments to retrieve historical data indicative of the user's prior activities when initiating a processing action. For example, as discussed in greater detail herein, the historical data may indicate which processing action a user typically utilizes when requesting a processing action within a particular channel; who a user typically sends the results of a processing action executed within a particular channel to; and/or the like.

In certain example embodiments, the environmental contextual data comprises data indicative of the identity of other users associated with an object for which a user requests initiation of a processing action. For example, the environmental contextual data may identify a sending user identifier of an object for which a user requests initiation of a processing action. As yet another example, the environmental contextual data may identify other user identifiers that have commented on, provided a response to, and/or otherwise interacted with a particular object for which a user requests initiation of a processing action.

In certain embodiments, the environmental contextual data may further comprise data indicative of a date, week, month, day-of-week, time, and/or the like when a user requests initiation of a processing action (e.g., embodied as a time stamp generated upon a user requesting a processing action). This time-based environmental data may be utilized to retrieve relevant historical data indicative of a user's prior history of requesting initiation of various processing actions at specific time periods (e.g., day, time-of-day, and/or the like).

Moreover, as noted above, the environmental contextual data comprises prior environmental contextual data, which may be indicative of a user's recent history of activity in association with the group-based communication platform 118 (e.g., during a single connection session between the user's client device and the group-based communication platform 118). For example, the prior environmental contextual data may comprise a history of user interface screens each associated with a particular channel identifier viewed by the user (e.g., during the current connection session; and/or spanning the current connection session and one or more prior connection sessions), how the user navigated between those user interface screens (e.g., selecting different communication channels from a complete listing of communication channels presented to the user or selecting hyperlinks presented within individual messages to move between communication channels), which may be indicated by a chronological order (e.g., reflected by time stamps associated with each of the channel identifiers stored within the environmental contextual data) in which the user visited various graphical interface screens. Such environmental contextual data may be utilized to determine whether a user is taking a similar navigational path to other users, and what processing action those other users ultimately utilized.

It should be understood that the foregoing examples should not be taken as limiting, and environmental contextual data may be indicative of other attributes of a user's interaction with a group-based communication interface. Moreover, environmental contextual data may comprise combinations of data collectively indicative of various attributes of a user's interaction with a group-based communication interface. Thus, determinations of a most-appropriate processing action may be made based on a plurality of attributes of the environmental contextual data. As just one non-limiting example, the environmental contextual data may indicate that a particular user is requesting initiation of a processing action at a particular time of day (e.g., 9:00 AM) on a particular day of week (Thursday) based on a message having a particular sending user identifier, which was shared within a particular communication channel associated with a particular group. As discussed in greater detail herein, each of these attributes may be considered relevant characteristics associated with the request for initiation of a processing action that may be collectively utilized to determine a most-relevant processing action and/or data to be included within payload data of the request to initiate the processing action via artificial intelligent and/or machine learning algorithms.

Establishing Environmental Contextual Data for a Processing Action

As noted above, environmental contextual data may be indicative of various attributes of a user's interaction with a group-based communication interface. These attributes may be determined based at least in part on metadata associated with messages (or other objects) shared via the group-based communication platform; formatting data utilized to generate a graphical user interface displayed to a user via a client device; data stored for various communication channels; data stored in user profiles; and/or the like.

The environmental contextual data may be stored in a cache memory storage area (e.g., a designated portion of a database storage area 120 accessible via the operation servers 110) of the group-based communication platform 118, and may be embodied as a fielded data storage area (e.g., each field comprising a portion of the environmental contextual data, such as a field comprising a session identifier, a field comprising an active channel identifier, one or more fields comprising prior channel identifiers (and associated time stamps), and/or the like). In other embodiments, the environmental contextual data may be provided as all metadata presented to a client device to generate a graphical display at the client device 102-106. Accordingly, the format and/or content of the environmental contextual data need not be limited to a defined set of content and format.

In certain embodiments, the format and/or content of the environmental contextual data may vary based on the type of processing action requested for execution. For example, environmental contextual data collected with respect to global processing actions may have a first content and/or format; environmental contextual data collected with respect to channel processing actions may have a second content and/or format; environmental contextual data collected with respect to message processing actions may have a third content and/or format; and/or environmental contextual data collected with respect to other object processing actions may have a fourth content and/or format. However, it should be understood that in other embodiments, the content and/or format of environmental contextual data may be consistent among all processing action types, as the environmental contextual data may be generated and/or collected prior to a user requesting initiation of a processing action.

FIG. 3 is a flowchart showing example steps for generating and/or retrieving environmental contextual data that may be utilized to select and/or generate one or more recommended processing actions for execution. The process reflected in FIG. 3 is discussed herein with further reference to the various processes performed by various components, as discussed in reference to FIGS. 5A-5C.

As shown at Block 301 of FIG. 3, environmental contextual data may be collected and cached constantly, on a periodic basis, and/or the like as a user navigates a group-based communication interface to interact with the group-based communication platform 118. In certain embodiments, the environmental contextual data is cached at the group-based communication platform 118 as data is transmitted to the client device 102-106 to generate the group-based communication interface for display to the user. As discussed herein, the environmental contextual data to be stored within the cache memory storage area may encompass all (or a portion) of the data utilized to generate the group-based communication interface for display at the client device 102-106. As new data is transmitted to the client device 102-106 for generation of a new display of the group-based communication interface, the environmental contextual data stored in the cache memory storage area is updated. For example, as a user navigates to an interface associated with a particular communication channel, a channel identifier corresponding to the particular communication channel is added to the environmental contextual data as a current channel identifier, together with a time stamp indicating when the user navigated to the channel specific interface. In certain embodiments, the environmental contextual data may further comprise data indicative of how the user first navigated to the particular communication channel interface (e.g., metadata indicating that the user clicked on a channel identifier within a user-specific listing of communication channels; whether the user searched for the channel and selected the channel identifier from within a search interface; whether the user selected a hyperlink in a message displayed in a different communication channel; and/or the like). In addition to using the time stamp to identify an elapsed amount of time the user interacts with a particular interface, the timestamp may be further usable to determine which messages (or other objects) were displayed to the user while the user interacted with the particular interface. Simultaneously, as the user navigates away from a previous interface associated with a different communication channel, the channel identifier associated with that different communication channel may be added to a listing of prior channel identifiers (together with corresponding time stamps indicative of when the user first navigated to the different communication channel interface and when the user navigated away from the different communication channel interface).

In certain embodiments, any previously stored environmental contextual data is replaced with the new environmental contextual data. In other embodiments, the environmental contextual data stored in the cache memory storage area is updated to include the newly generated environmental contextual data (without removing the existing environmental contextual data). In the latter embodiments, the cache memory storage area to be utilized for storing the environmental contextual data may be size limited, such that a portion of the stored environmental contextual data may be removed as new environmental contextual data is generated when the cache memory storage area is full. As just one example, the cache memory storage area may be characterized by a first-in-first-out storage criteria, by which the oldest (first generated data stored therein) is removed upon introduction of newly generated environmental contextual data. Moreover, upon the occurrence of one or more defined events, the entirety of the environmental contextual data may be deleted from the cache memory storage area. For example, upon receipt of a request generated by a client device 102-106 associated with the user to clear the cache memory storage area, the cache memory storage area may be cleared. As another example, upon receipt of data indicating that an app executing on the client device 102-106 in association with the group-based communication platform 118 has been closed, the group-based communication platform 118 may clear the cache memory storage area. In other embodiments, the cache memory storage area may be cleared with respect to a particular user and/or client device in response to a trigger event, such as receipt of a request (e.g., generated based at least in part on user input received at the client device) to clear the cache memory storage area.

In other embodiments, the cache memory storage area may be defined as a part of the client device 102-106. In these embodiments, data stored within the cache memory storage area may not be transmitted to the group-based communication platform 118 except as provided in association with the following discussion for recommending processing actions to the user of the client device. Thus, to increase a user's privacy, the user's usage data (as reflected by the environmental contextual data) is stored locally at the user's own client device 102-106 unless and until necessary for execution of various processes discussed herein. The content and/or methodology of the stored environmental contextual data may be similar to that discussed above with respect to the storage of environmental contextual data at the group-based communication platform 118. In other embodiments, the environmental contextual data to be stored locally within cache memory storage areas of the client device 102-106 may be compressed to conserve memory resources of the client device 102-106 for storage. As just one example, rather than storing the entirety of a message and its associated metadata within the cache memory of the environmental contextual data, the client device 102-106 may substitute a message identifier for storage within the cache memory. That message identifier may later be utilized by the group-based communication platform 118 (if transmitted thereto) to identify the entirety of the environmental contextual data. Similarly, channel identifiers may be stored in place of complete channel data to decrease the amount of data needed to be stored for a complete representation of the environmental contextual data.

Moreover, in embodiments in which the client device 102-106 stores the environmental contextual data locally within cache memory storage areas of the client device 102-106, the client device 102-106 is configured to generate and/or otherwise consolidate data utilized for generation of the graphical interfaces of the group-based communication interface for storage within the cache memory storage area simultaneously with (or temporally proximate to) generating the graphical display for the user.

With reference again to FIG. 3, the environmental contextual data stored in the cache memory storage area (regardless of whether stored at the client device or at the group-based communication interface) is retrieved for use with respect to the processes reflected at Block 302-303. Specifically, as indicated at Block 302, the client device 102-106 receives a user input requesting the initiation of a processing action (also reflected at Block 503 of FIG. 5A). The user input may be provided as a user selecting a particular user interface element utilized to initialize a processing action. As noted above, certain embodiments may comprise a plurality of user interface elements, each corresponding to a different type of processing action.

Upon receipt of a request to initiate a processing action, the process proceeds to Block 303, at which time the environmental contextual data collected and stored for the user at the time the processing action is requested is passed to the operation servers 110 for a determination in real-time of one or more recommended processing actions for the user based at least in part on the environmental contextual data. As shown at Block 504 of FIG. 5A, the user input indicative of a processing action request is provided to the operation servers 110, which retrieves cached environmental data relevant to the request (e.g., from the database storage area 120 as shown in FIG. 5A, or from a storage area associated with the client device 102-106).

The operation servers 110 utilize one or more models and/or algorithms generated via machine learning and/or artificial intelligence based at least in part on training data to determine (and/or generate) one or more recommended processing actions for presentation to the user as shown at Block 505 of FIG. 5A. The training data in certain embodiments comprises sets of training data, wherein each set of training data comprises environmental contextual data (e.g., active channel identifiers; prior channel identifiers (and their respective order of presentation to the user); active group identifiers; time stamps; and/or the like) presented when a processing action was requested, and the processing action(s) ultimately selected by the user (and the order of processing actions selected, if multiple processing actions are selected). Training data may be group-specific (or other subset of user-specific) and may be utilized to generate models and/or algorithms specific to a particular group. Moreover, the training data as well as the resulting models and/or algorithms may be stored in a memory storage area accessible to the operation servers 110, such that the operation servers may quickly access and apply the stored models and/or algorithms based on the environmental contextual data retrieved for the particular requested processing action.

In embodiments in which one or more processing actions, or a workflow order of a plurality of processing actions are automatically generated (e.g., via machine learning and/or artificial intelligence), the operation servers 110 utilize training data to determine one or more user interactions with the group-based communication platform 118 (as well as their respective order of interaction) initiated by a user, as well as the contextual data associated therewith. Such interactions may themselves comprise one or more processing actions, and/or the interactions may comprise intra-user interface interactions (e.g., copying a particular text portion from a message within a first communication channel and pasting the text portion into a new message within a second communication channel; viewing a series of communication channels in a specific order; and/or the like). The operation servers 110 may ultimately generate a new processing action comprising a workflow series of a plurality of processing actions and/or one or more intra-interface interactions with the group-based communication interface. This new and automatically generated processing action may be presented as a recommended processing action to a user, for example, upon identification of contextual data deemed relevant for execution of the automatically generated processing action. In certain embodiments, such automatically generated processing actions may be applicable to a single user, such that the automatically generated processing actions are not available to other users, regardless of their association with particular groups, and/or the like.

As indicated at Block 304 of FIG. 3 (and Block 505 of FIG. 5A), once recommended processing actions are determined, the group-based communication platform 118 assembles a contextual processing action list of processing actions to be presented to the user. As shown at FIG. 6, which illustrates an example group-based communication interface 800 comprising a contextual processing action list 804 of processing actions available for a message 802. Specifically, the illustrated contextual processing action list 804 comprises message-based processing actions, and the contextual processing action list 804 is accessible in response to the user selecting a graphical user interface element (e.g., a displayed button) associated with the message 802. The contextual processing action list may comprise a defined number of recommended processing actions (e.g., the most-highly recommended processing actions) and may end with an option for searching for other processing actions (for example, the contextual processing action list 804 shown in FIG. 6 ends with an option for selecting "more message actions") that may not be listed within the contextual processing action listing. FIG. 7 provides yet another example group-base communication interface 1000 providing additional listed processing actions, and including a search bar for searching for otherwise unlisted processing actions not included within the illustrated contextual processing action list. With reference to Blocks 507-508 of FIG. 5A, the generated contextual processing action list is transmitted to the requesting client device 102-106, which displays the contextual processing action list to the user.

Specifically, upon receipt of the contextual processing action list from the group-based communication platform 118 (e.g., from the operation servers 110), the client device 102-106 initializes a graphical interface component to be populated with the contextual processing action list (as shown at Block 507) and displays the contextual processing action list within the initialized graphical interface component (as shown at Block 508).

In certain embodiments, to determine the most-highly recommended processing actions, all processing actions available (e.g., all processing actions available to the particular user, all processing actions available within a particular channel, all processing actions available to users associated with a particular group, and/or the like) may be assigned a relevance score by the model and/or algorithm discussed herein. Those processing actions having the highest relevance score (e.g., the defined quantity of processing scores having the highest relevance scores) are then selected for inclusion within the contextual processing action list to be presented to the user via the group-based communication interface presented via the client device 102-106. The processing actions included within the contextual processing action list may comprise processing actions executable by a plurality of validated external resources 112-116. For example, the processing actions included within the contextual processing action list may comprise a first processing action executable by a first validated external resource 112; a second processing action executable by the first validated external resource 112; a third processing action executable by a second validated external resource 114; and a fourth processing action executable by a third validated external resource 116. In other embodiments, the processing actions included within the contextual processing action list may comprise a plurality of processing actions all executable by a common validated external resource. It should be understood that the exact mix of processing actions included within the contextual processing action list may be determinable based at least in part on the environmental contextual data, as discussed herein.

As an example relating to global processing actions, historical data for a particular user indicates that the user generally executes a global processing action for retrieving her task list and for retrieving her assistant's task list at approximately 8:30 AM each weekday. Thus, when the user launches an app for interacting with the group-based communication platform 118, the group-based communication platform 118 (and/or the client device 102-106) begins collecting and caching environmental contextual data comprising data indicative of a current time of day. When the user selects a user interface element for requesting a global processing action, the environmental contextual data is passed to the operation servers 110, which applies one or more models and/or algorithms to the environmental contextual data. Those models and/or algorithms are generated based at least in part on the mentioned historical data regarding the user's typical action for requesting task lists for herself and her assistant at approximately 8:30 AM each morning. Thus, upon those models determining that a current time at which the user requests to initiate execution of a global processing action is approximately 8:30 AM (based at least in part on the environmental contextual data), the group-based communication platform 118 may determine that a task-list processing action (executable by a first validated external resource 112) is a most recommended global processing action for presentation to the user. Thus, when providing a contextual processing action list of suggested global processing actions for the user, the task-list processing action may appear at the top of the list. As discussed in greater detail below, under this same example, the group-based communication platform 118 may further determine appropriate data to pass to the task-list processing action to retrieve the desired task-lists for the user.

Extending the above-mentioned example, historical data may further indicate that a large majority of users ignore their typical routine when first opening an app for interaction with the group-based communication platform 118 on January 2. The historical data may further indicate that, rather than following a typical routine, a majority of users start their day by first executing a global processing action for retrieving paycheck data to view their end-of-year bonus (this global processing action being executable by a second validated external resource 114). This data may be reflected within training data utilized to train models and/or algorithms for recommending processing actions to a user. Thus, on January 2, when the same user mentioned in the previous example initializes her app for interaction with the group-based communication platform 118, the group-based communication platform 118 (and/or the client device 102-106) begins caching environmental contextual data. When the user interacts with a user interface element for executing a global processing action at approximately 8:30 AM, the environmental contextual data is passed to the operation servers 110, which applies relevant models and/or algorithms to the environmental contextual data, and determines that (a) typically the user requests task-lists (as noted above), however (b) a majority of users forego their typical morning routine to request paycheck data via a corresponding global processing action. Depending on whether the model determines that the particular user generally follows trends of other users, or whether the user is found to be more strongly tied to routine, the operation servers 110 may determine whether the typical task-list processing action (executable by the first validated external resource 112) or the paycheck processing action (executable by the second validated external resource 114) is more relevant to the user, and those processing actions may be presented to the user within a contextual processing action list, in an order dictated by the level of relevance determined for each processing action (e.g., based on a determined relevance score for each processing action). Thus, the contextual processing action list presented to the user under the above-mentioned scenario may comprise by the task-list processing action (executable by the first validated external resource 112) and the paycheck processing action (executable by the second validated external resource 114).

In another example, a user may be interacting with other users within a newly formed communication channel having a corresponding channel identifier. Those other users may collectively form an entire team dedicated to fixing bugs within a new software feature. Historical data may indicate that when a channel-based processing action is requested for a channel including approximately the same grouping of other users, the channel-based processing action typically chosen is a bug logging and triaging processing action. Thus, while a user navigates to the newly formed channel and while the user interacts with the communication channel, environmental contextual data is cached (e.g., at the group-based communication platform 118 and/or at the client device 102-106). Upon the user selecting a user interface element for requesting initiation of a channel-based processing action, the environmental contextual data is passed to the operation servers 110, which applies a relevant model and/or algorithm. The model and/or algorithm may then determine that based on the identity of the other users within the communication channel (e.g., as determined based at least in part on user identifiers indicated as members of the channel (as reflected by a corresponding channel identifier), all of which being reflected within the environmental contextual data), a likely most relevant channel-based processing action is the bug logging and triaging processing action noted above. Thus, the group-based communication platform 118 (e.g., the operation servers 110) assembles a contextual processing action list of recommended channel-based processing actions, including the bug logging and triaging processing action as a most-highly recommended channel-based processing action.

As yet another example, a user may request a message-based processing action for an automatically generated message from another specific processing action (however it should be understood that message-based processing actions may be requested for non-automatically generated messages, such as messages generated and sent from another user). Historical data may indicate that when that user interacts with messages generated by the specific processing action (e.g., as reflected by a sending user identifier attributable to the particular processing action and/or the validated external resource executing the particular processing action), the user historically requests initiation of a task-list processing action to add the message to the user's task-list. Thus, as a user navigates through various screens of a group-based communication interface until ultimately requesting a message-based processing action for the particular message generated by the specific processing action, environmental contextual data is cached (e.g., by the group-based communication platform and/or by the client device). Once the user requests initiation of a message-based processing action for the particular message, the environmental contextual data cached for the user's interactions with the group-based communication interface is passed to the operation servers for application of an appropriate model and/or algorithm, which may determine that a most-recommended message-specific processing action for the particular user is the task-list processing action noted above.

As noted above, the environmental contextual data utilized for determining a most-recommended processing action may be more complex than merely the identity of a particular message, user, group of users, channel, and/or the like. For example, a user may be searching for information regarding how to add funds to the user's retirement account. The user may execute a search for "retirement account," then may briefly visit one or more communication channels discussing retirement accounts before visiting a particular communication channel containing a message shared by a company HR manager which provides hyperlinks to a company-wide retirement planning communication channel. The user may select the hyperlink to be directed to the noted retirement planning communication channel, where the user views a message describing the particular global processing action utilized to add funds to the user's retirement account. This series of interactions with the group-based communication platform 118 may be reflected within the user's environmental contextual data by a plurality of channel identifiers (and corresponding time stamps) reflecting the user's navigational history immediately prior to requesting a processing action. Moreover, the environmental contextual data may further comprise data indicative of how the user selected each of the prior communication channels (e.g., selecting channel identifiers from a search interface; selecting channel identifier hyperlinks within messages; and/or the like). Following the prior discussion, the group-based communication platform and/or the client device may cache environmental contextual data indicative of the user's navigational history through the various communication channels. Historical data may suggest that other users having a similar navigational history (e.g., including selecting the noted hyperlink) execute a banking global processing action while the users are viewing the retirement planning communication channel. Thus, when the user selects a user interface element requesting initiation of a global processing action, the user's environmental contextual data is passed to the operation servers, which applies an appropriate model and/or algorithm and determines that the most-recommended global processing action is the noted banking processing action. Thus, the group-based communication platform generates a contextual processing action list including the banking processing action as a most-recommend processing action to be presented to the user.

In certain embodiments, users (e.g., sending users of particular messages and/or administrative users) may manually assign weights to particular processing actions to be recommended to users (e.g., for particular messages, for execution within particular channels, and/or the like). Thus, when an appropriate model and/or algorithm determines a relevance score for processing actions to be provided to the user, the weighting assigned by a user may cause a particular processing action to receive a higher relevance score (and thus the processing action may be more likely to be determined to be a most-recommended processing action that is displayed within the contextual processing action list). As just one non-limiting example that is related to the above retirement planning example, the sending user of a specific message within the retirement planning communication channel that provides instructions for adding funds to a retirement account may assign a high weight to a message-specific processing action for launching the above-mentioned banking processing action. Thus, when users launch a processing action relating to the particular message, the banking processing action will most-likely be assigned as the most-recommended processing action for a requesting user. Although not shown, assigning weights as noted herein may be performed by a user interacting with a message (e.g., a message sent by the user), and interacting with a particular user interface element enabling a user to select a particular processing action and/or to assign a manually-selected weight for the particular processing action. In other embodiments, a user (e.g., a sending user or and administrative user) may manually override the model and/or algorithm scoring methodology to assign a most-relevant processing action for a particular message, other object, channel, group, and/or the like.

Passing Environmental Contextual Data to a Validated External Resource

To initialize a selected processing action, the group-based communication platform 118 (e.g., the operation servers 110) passes a container comprising routing data and payload data to the validated external resource 112-116 designated to execute the selected processing action. As shown in FIG. 5B, the client device 102-106 first receives a user selection of a particular processing action for initialization, as shown at Block 509. This user selection may be made from the contextual processing action list displayed to the user as indicated at Blocks 507-508, or the user selection may be made from a search for a particular processing action (the search function being accessible via a particular portion of the contextual processing action list for searching for additional available processing actions). The selection of the particular processing action is passed to the group based communication platform 118 (e.g., the operation servers 110), as indicated at Block 510 of FIG. 5B, and at least a portion of the environmental contextual data generated for the particular user (and/or client device 102-106) is received (e.g., from a storage database 108 and/or from the client device 102-106) as indicated at Block 511.

Moreover, depending on the information needed by the validated external resource for executing a particular processing action, the group-based communication platform may automatically select portions of the received environmental contextual data to populate the payload data of the container to be passed to the validated external resource 112-116 to initialize the processing action. Selection of appropriate portions of the environmental contextual data to be included within the payload data may be made in accordance with a machine learning and/or artificial intelligence model, as reflected in Block 512, as well as data indicative of the needed data types (and/or formats) for execution of the selected processing action.

Once specific portions of the environmental contextual data is selected for inclusion as payload data to be provided to the validated external resource, the group-based communication platform 118 provides the client device 102-106 with a proposed processing action request, inclusive of the environmental contextual data portions to be provided to the validated external resource 112-116. As reflected at Blocks 513-515, the client device receives the proposed processing action request, initializes an interface component to be displayed to the user (Block 513), displays an interactive dialog that enables the user to view and/or edit the proposed processing action request (e.g., to view the portions of the environmental contextual data to be passed to the validated external resource 112-116 and/or to edit, remove, or supplement any data to be passed to the validated external resource 112-116) (Block 514), and receives user edits to the proposed processing action request (if applicable, as reflected at Block 515). The edited (or confirmed) proposed processing action request is then passed back to the group-based communication platform 118 (e.g., the operation servers 110) as indicated at Block 516, which then transmits the request to initialize the processing action to the applicable validated external resource 112-116 as indicated at Blocks 517 and 518.

In certain embodiments, environmental contextual data is passed to a validated external resource 112-116 as a portion of payload data usable in executing a processing action. For proper execution of a selected processing action, certain validated external resources 112-116 require input of substantive data as input parameters on which the processing action is to be performed. As noted above, this substantive data may be provided within a request for execution of a processing action as a part of payload data included with the request. As noted above, the request may additionally comprise routing data indicative of the identity of the processing action to be performed, as well as additional metadata included to ensure the results of the processing action are provided to the appropriate user and/or client device 102-106.

Selection of appropriate portions of the collected and retrieved environmental contextual data for inclusion in the payload data portion of the request may be made based at least in part on data types needed for execution of the selected processing action and/or portions of the environmental contextual data deemed most likely to be relevant to the selected processing action. Determinations of most relevant portions of the environmental contextual data may be made via one or more models and/or algorithms that may be built via machine-learning and/or artificial intelligence-based methodologies. In certain embodiments, determinations of most-relevant environmental contextual data may be made simultaneously with determinations of a most-relevant (and/or otherwise suggested) processing action. In other embodiments, determinations of most-relevant environmental contextual data may be made separately, so as to minimize latency associated with presentation of the contextual processing action list of recommended processing actions.

FIG. 4 illustrates an example flowchart of a method for selecting portions of environmental contextual data for inclusion in payload data provided to a validated external resource for execution of a processing action.

As shown at Block 401, one or more processing actions are identified for which payload data is to be identified. In certain embodiments, the group-based communication platform 118 stores data indicative of each processing action available for execution via processing action methodologies as discussed herein. The stored data indicative of each of the available processing actions may be light-weight, such that it only includes data indicative of the identity of the processing action (e.g., a name, short description, icon, and/or the like), the identity of the validated external resource configured to execute the processing action, and/or portions of routing data necessary to initiate a request for execution of the processing action (e.g., to request an indication from the validated external resource of what types of input parameters should be provided in the payload data provided in a separate transmission). In other embodiments, the stored data indicative of each of the available processing actions may be more substantive, such that the stored data comprises data indicative of the types of input parameters necessary for execution of the processing action, such that a minimal number of transmissions are necessary between the group-based communication platform and the validated external resource 112-116 to initiate execution of a selected processing action (once selected).

Thus, the group-based communication platform 118 may determine what input parameters are necessary for execution of a processing action prior to/while generating the contextual processing action list of processing actions to be recommended to a user. The stored data indicative of input parameters necessary for execution of a selected processing action may be immediately provided to a user (and/or used for selecting portions of environmental contextual data for inclusion in the payload data immediately after receiving a selection of a processing action for execution, as discussed herein). Thus, for those embodiments in which data indicative of input parameters for various processing actions are stored at the group-based communication platform 118, the process may skip to processes reflected at Block 404 after receipt of a user input selecting a particular processing action to be performed for a user. Such user input may be provided by selecting a processing action presented as a portion of a contextual processing action list via a client device 102-106, and the client device 102-106 providing data indicative of the user input to the group-based communication platform 118.

In other embodiments, the process continues as represented at Block 402, and the group-based communication platform provides a request to the validated external resource associated with a processing action selected from a contextual processing action list for data indicative of input parameters necessary for execution of the selected processing action. The group-based communication platform 118 may thus request data indicative of the required input parameters for a particular processing action after receipt of user input at the client device 102-106 (which may then be passed to the group-based communication platform 112-116) selecting a particular processing action to be performed.

With reference briefly to FIGS. 5B-5C, the validated external resource 112-116 may determine what input parameters are necessary for execution of the requested processing action, as indicated at Block 519. In certain embodiments, needed input parameters may comprise a user selection of one of a plurality of previously generated selectable options (e.g., a particular previously generated to-do list to supplement with the new data entry; a particular previously generated file storage location to use for the new data entry; and/or the like), and thus determining necessary input parameters may comprise collecting data indicative of available options from which a user is to be instructed to select. Upon determining the necessary input parameters, the validated external resource 112-116 passes a response back to the group-based communication platform 118 (e.g., the operation servers 110) indicative of needed input parameters, as indicated at Block 520.

With reference again to FIG. 4, and as shown at Block 403, in embodiments in which data indicative of input parameters is requested from the validated external resource 112-116 after selection of a processing action for execution, the group-based communication platform 118 receives the requested data indicative of necessary input parameters for execution of the selected processing action, such that the group-based communication platform 118 may proceed to collect at least a portion of the data requested as input parameters (e.g., as portions of the environmental contextual data).

With reference to Block 404 of FIG. 4, the group-based communication platform 118 identifies one or more portions of the cached environmental contextual data to be included as a part of the payload data that is ultimately to be provided to the validated external resource 112-116 for execution of the selected processing action. As mentioned above, the group-based communication platform 118 may utilize the data indicative of the required input parameters of the selected processing action, as well as the results of one or more models and/or algorithms (e.g., machine learning models and/or algorithms and/or artificial intelligence models and/or algorithms) to select particular portions of the cached environmental contextual data for inclusion as payload data to be provided to the validated external resource 112-116.

As an example, for a channel-based processing action to add a new task to a shared task list, the group-based communication platform 118 may determine that historical data indicates that a particular user adds tasks to a defined task list associated with the channel, and delegates those tasks to three specific user identifiers. Thus, using models and/or algorithms for populating necessary input parameters for the identified channel-based processing action, the group-based communication platform 118 may automatically populate input parameters selecting a particular task list and delegates for the task to be generated.

With reference to Block 405 of FIG. 4 (and Block 521 of FIG. 5C), the group-based communication platform 118 may thereafter seek user input for any input parameters not otherwise automatically identified/suggested by the group-based communication platform 118, and to seek confirmation from the requesting user of the suggested input parameters generated from the environmental contextual data. In certain embodiments, the group-based communication platform 118 may generate and present an interactive dialog, which may be embodied as a fillable form to the client device 102-106 for presentation to the user. Each field of the fillable form may correspond to an input parameter of the processing parameter. For those input parameters for which the group-based communication platform 118 has automatically identified recommend portions of the environmental contextual data, the corresponding fillable fields of the form may be prepopulated with the recommended input parameters identified by the group-based communication platform 118. The fillable form may be configured such that a user may delete and replace the automatically generated input parameters, if desired, and/or the user may populate otherwise unfilled fields corresponding to other input parameters for which the group-based communication platform 118 has not automatically identified input parameters.

With specific reference to FIG. 5C, upon generating the request for additional input parameters from the user at the group-based communication platform 118 (e.g., at the operation servers 110), the request is transferred to a client device 102-106 associated with the user, which initializes an interface component for display via the client device 102-106 to the user (as indicated at Block 522), and populates the interface component with data received from the group-based communication platform 118 (e.g., from the operation servers 110) to request additional input parameters from the user (as reflected at Block 523). As discussed herein, the populated interface component may be embodied as a fillable form with one or more fillable fields, drop-downs, check-boxes, and/or the like usable by a user to provide additional needed input parameters, as indicated at Block 524. Once the user provides the needed input parameters, the client device 102-106 passes the input parameters back to the group-based communication platform 118 (e.g., the operation servers 110), as indicated at Block 525, which then passes the input parameters along to the validated external resource 112-116 for execution of the requested processing action.

FIG. 8 provides an example group-based communication interface 1100 having an interactive dialog 1102 embodied as a fillable form partially filled with environmental contextual data. As shown therein, the fillable form comprises a dialog for selecting a "Story" for which a particular message (or other selected object) is to be attached. As a simplified example shown with respect to 1104, the environmental contextual data surrounding the selected object comprises a message in which another user specifically defines "Olympia" as a term relevant to the discussion. Thus, based at least in part on this environmental contextual data (and/or based at least partially on data indicating that "Olympia" is the title of a Story associated with the requesting user), the group-based communication platform automatically populates "Olympia" as a recommended story as shown at 1103. However, the fillable form of the interactive dialog 102 additionally comprises other, unfilled fields (specifically, for additional comments) that may be separately populated by the user.

Once the user has confirmed and/or modified the data to be provided as input parameters within the payload data to be provided to the validated external resource 112-116 (e.g., by providing user input to the client device 102-106 confirming the provided data, which may be passed to the group-based communication platform 118), the group-based communication platform 118 passes data to the validated external resource 112-116 for execution of the processing action. The group-based communication platform 118 generates a container comprising routing data and payload data for the requested processing action, as indicated at block 406. As discussed herein, the container comprises routing data identifying data usable by the validated external resource 112-116 to identify the requested processing action, to identify the client device 102-106 requesting the processing action, and/or the like. As a specific example, the group-based communication platform 118 assembles the routing data for the container to comprise (1) one or more verification tokens (e.g., a group-based communication platform 118 verification token), (2) a group-identifier, (3) a channel identifier, (4) a user identifier (e.g., a client device 102-106 specific client token identifying the client device 102-106 that requests the particular processing action), (5) a processing action identifier (e.g., a processing action name, and/or other identifying string), (6) an action type defining a processing action type, (7) a response URL enabling the validated external resource to transmit a response (e.g., a confirmation response) back to the requesting client device 102-106, (9) a timestamp indicating when the processing action is requested, and/or the like. The container additionally comprises payload data comprising any input parameters for which the processing action was requested.

Upon generation of the container, the group-based communication platform 118 provides the container to the validated external resource 112-116 identified with the contextual data, for example, via a proxy endpoint identified within the contextual data, as shown at Block 407 of FIG. 4. The proxy endpoint provides an API for passing the container from the group-based communication platform 118 to the validated external resource 112-116, thereby enabling the validated external resource 112-116 to consume at least a portion of the routing data and/or the payload data within the container while executing a requested processing action. Providing the container to the validated external resource 112-116 causes the validated external resource 112-116 to initiate execution the requested processing action as identified in the routing data, as shown at Block 408 of FIG. 4 (and Block 527 of FIG. 5C).

As discussed herein, the processing action may cause the validated external resource 112-116 to generate a new data object to be stored within a data repository associated with the validated external resource 112-116, to modify an existing data object stored within the data repository associated with the validated external resource 112-116, to delete an existing data object stored within the data repository associated with the validated external resource 112-116, and/or the like. For example, the validated external resource 112-116 may execute a calendar app, and therefore the processing action may be configured to generate a new calendar entry to be stored within the data repository associated with the validated external resource 112-116. As yet another example, the validated external resource 112-116 may be embodied as a software bug tracking system, and therefore the processing action may edit an existing record associated with a particular software bug with additional information as identified within a particular message shared within the group-based communication platform 118.

If necessary, the validated external resource 112-116 may provide a response to the group-based communication platform 118 requesting additional information necessary for completion of the requested processing action. For example, the validated external resource 112-116 provides data back to the group-based communication platform 118 which causes the group-based communication platform 118 to provide an interactive dialog to the requesting client device 102-106. In certain embodiments, the interactive dialog may request data indicative of a particular data object stored within the data repository associated with the validated external resource 112-116 to be edited based on execution of the processing action. The interactive dialog may additionally be configured to receive additional data (e.g., text-based data, images, and/or the like) as additional comments to be provided with the payload data to the validated external resource 112-116.

The group-based communication platform 118 may additionally be configured for interpreting one or more error states that may be encountered as a result of passing the container to the validated external resource 112-116. For example, if the group-based communication platform 118 does not receive a response from the validated external resource 112-116 within a defined period of time (e.g., 5 seconds after transmitting the container via the proxy endpoint), the group-based communication platform 118 may provide an error message (e.g., in the form of an icon, a dialog, or a message displayed within the communication interface). As yet another example, upon receipt of a response from the validated external resource 112-116 indicating an error occurred, the group-based communication platform 118 may be configured to communicate the received error response to the requesting client device 102-106. While the group-based communication platform 118 awaits the receipt of the response, the client device 102-106 may maintain an open dialog indicative of the requested processing action, such that any errors received and passed on to the client device 102-106 may be easily correlated with the recently requested processing action.

Once the validated external resource 112-116 completes execution of the requested processing action, the validated external resource 112-116 provides a confirmation response to the group-based communication platform 118, as indicated at Block 409 of FIG. 4 (and Blocks 528-529 of FIG. 5C), and the group-based communication platform 118 provides a confirmation message to the requesting client device 102-106, as indicated at Block 410 of FIG. 4 (and Block 530 of FIG. 5C). With reference specifically to FIG. 5C, the requesting client device 102-106 receives data confirming execution of the processing action, as indicated at Block 531, and the requesting client device 102-106 then displays a confirmation of the processing action execution to the user (e.g., within a generated interface element) as indicated at Block 532. In certain embodiments, the confirmation message may be displayed via a dialog displayed via the user interface of the requesting client device 102-106 or the confirmation message may be displayed as a message exchanged via the group-based communication platform 118. In certain embodiments, the confirmation message may be displayed within the same communication channel in which the message (if applicable) of the payload data was originally shared (e.g., the confirmation message may be shared publicly to be visible to all client devices 102-106 having access to the particular communication channel, or the confirmation message may be shared privately, to be visible only to the requesting client device 102-106). The confirmation message may alternatively be provided to the requesting client device 102-106 via a separate communication channel operable between the requesting client device 102-106 and the validated external resource 112-116 (e.g., operating an app that provides messages to the client device 102-106).

Generating Training Data

As noted above, determinations of recommended processing actions to be provided to a user within a contextual processing action list, as well as recommend environmental contextual data to be utilized as payload data to be provided to a validated external resource may be determined based at least in part on machine-learning and/or artificial intelligence algorithms utilizing training data. The training data may encompass at least a portion of historical data including pairs of environmental contextual data and processing actions ultimately selected (and/or payload data provided for execution of the processing actions). In certain embodiments, the training data further comprises data indicative of all available processing actions, as well as where those processing actions are available (e.g., global processing actions, message processing actions, and/or the like). Thus, the training data may be reflective of potential similarities between the execution of a global processing action and the execution of a message processing action, based on identified similarities in related contextual data.

Moreover, to the extent that one or more processing actions, workflows, and/or the like are automatically generated, the training data may comprise data indicative of combinations of processing actions (and/or other actions taken by a user), as well as corresponding contextual data. Accordingly, as discussed herein, the group-based communication platform may utilize machine learning and/or artificial intelligence to automatically construct processing actions and/or workflows, and to recommend those processing actions and/or workflows to a user upon the identification of contextual data identified as relevant.

Thus, as processing actions are selected and executed via data shared through the group-based communication platform, the group-based communication platform of certain embodiments assembles historical data to generate training data for the machine-learning and/or artificial intelligence models/algorithms to make accurate predictions of the processing actions typically requested by users under certain circumstances represented by environmental contextual data.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, implemented at least in part by a server computing device associated with a communication platform, the method comprising:
receiving, from a client associated with a user via a communication interface corresponding to an application associated with the communication platform, a user input requesting an initiation of a potential action;
identifying, based at least in part on the user input, a communication channel associated with one or more interactions of the user;
identifying a plurality of interactions associated with a plurality of users corresponding to the communication channel;
determining that at least one other user of the plurality of users previously requested performance of the potential action in association with the communication channel;
identifying, based at least in part on the at least one other user of the plurality of users previously requesting the performance of the potential action, the potential action to be performed by an external resource; and
causing the client to generate an interface element comprising the potential action for presentation via the communication interface.

2. The method of claim 1, further comprising:
receiving, from the client via the interface element, an indication of selection of the potential action; and
sending, to a computing device associated with the external resource, an instruction to perform the potential action.

3. The method of claim 1, further comprising:
identifying a plurality of potential actions that are available to the client; and
determining that the potential action is associated with the one or more interactions,
wherein the potential action is identified based at least in part on an association between the potential action and the one or more interactions.

4. The method of claim 1, wherein the one or more interactions are associated with a first connection session, the method further comprising:
identifying one or more second interactions associated with a second connection session, the second connection session being prior to the first connection session,
wherein the potential action is identified based at least in part on the one or more second interactions.

5. The method of claim 1, wherein:
the one or more interactions are associated with a group identifier, and
the potential action is determined based at least in part on the group identifier.

6. The method of claim 1, wherein the user input to initiate the potential action comprises requesting the communication platform to display the potential action via the communication interface.

7. The method of claim 1, wherein the one or more interactions are received at one or more previous times.

8. A system comprising:
one or more processors; and
one or more non-transitory computer readable media storing instructions that, when executed, cause the system to:
receiving, from a client associated with a user via a communication interface corresponding to an application associated with a communication platform, a user input requesting an initiation of a potential action;
identifying, based at least in part on the user input, a communication channel associated with one or more interactions of the user;
identifying a plurality of interactions associated with a plurality of users corresponding to the communication channel;
determining that at least one other user of the plurality of users previously requested performance of the potential action in association with the communication channel;
identifying, based at least in part on the at least one other user of the plurality of users previously requesting the performance of the potential action, the potential action to be performed by an external resource; and
causing the client to generate an interface element comprising the potential action for presentation via the communication interface.

9. The system of claim 8, wherein the instructions further cause the system to:
receive, from the client via the interface element, an indication of selection of the potential action; and
send, to a computing device associated with the external resource, an instruction to perform the potential action.

10. The system of claim 8, wherein the instructions further cause the system to:
identify a plurality of potential actions that are available to the client; and
determine that the potential action is associated with the one or more interactions,
wherein the potential action is identified based at least in part on an association between the potential action and the one or more interactions.

11. The system of claim 8, wherein the one or more interactions are associated with a first connection session, and wherein the instructions further cause the system to:
identify one or more second interactions associated with a second connection session, the second connection session being prior to the first connection session,
wherein the potential action is identified based at least in part on the one or more second interactions.

12. The system of claim 8, wherein the user input to initiate the potential action comprises requesting the communication platform to display the potential action via the communication interface.

13. The system of claim 8, wherein the one or more interactions are received at one or more previous times.

14. The system of claim 8, wherein:
the one or more interactions are associated with a group identifier, and
the potential action is determined based at least in part on the group identifier.

15. One or more non-transitory computer readable media storing instructions that, when executed, cause one or more processors to:
receiving, from a client associated with a user via a communication interface corresponding to an application associated with a communication platform, a user input requesting an initiation of a potential action;
identifying, based at least in part on the user input, a communication channel associated with one or more interactions of the user;
identifying a plurality of interactions associated with a plurality of users corresponding to the communication channel;
determining that at least one other user of the plurality of users previously requested performance of the potential action in association with the communication channel;
identifying, based at least in part on the at least one other user of the plurality of users previously requesting the performance of the potential action, the potential action to be performed by an external resource; and
causing the client to generate an interface element comprising the potential action for presentation via the communication interface.

16. The one or more non-transitory computer readable media of claim 15, wherein the instructions further cause the one or more processors to:
receive, from the client via communication interface, an indication of selection of the potential action; and
send, to a computing device associated with the external resource, an instruction to perform the potential action.

17. The one or more non-transitory computer readable media of claim 15, wherein the instructions further cause the one or more processors to:
identify a plurality of potential actions that are available to the client; and
determine that the potential action is associated with the one or more interactions,
wherein the potential action is identified based at least in part on an association between the potential action and the one or more interactions.

18. The one or more non-transitory computer readable media of claim 15, wherein the one or more interactions are associated with a first connection session, and wherein the instructions further cause the one or more processors to:
identify one or more second interactions associated with a second connection session, the second connection session being prior to the first connection session,
wherein the potential action is identified based at least in part on the one or more second interactions.

19. The one or more non-transitory computer readable media of claim 15, wherein the user input to initiate the potential action comprises requesting the communication platform to display the potential action via the communication interface.

20. The one or more non-transitory computer readable media of claim 15, wherein the one or more interactions are received at one or more previous times.

* * * * *